(12) United States Patent
Nagano

(10) Patent No.: US 10,830,948 B2
(45) Date of Patent: Nov. 10, 2020

(54) OPTICAL DEVICE AND METHOD FOR MANUFACTURING OPTICAL DEVICE

(71) Applicant: Sumitomo Electric Industries, Ltd., Osaka (JP)

(72) Inventor: Shigehiro Nagano, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 16/836,233

(22) Filed: Mar. 31, 2020

(65) Prior Publication Data

US 2020/0225408 A1    Jul. 16, 2020

Related U.S. Application Data

(60) Division of application No. 16/014,681, filed on Jun. 21, 2018, now Pat. No. 10,663,656, which is a (Continued)

(30) Foreign Application Priority Data

Dec. 24, 2015 (JP) ................................. 2015-251286

(51) Int. Cl.
*G02B 6/32* (2006.01)
*G02B 6/036* (2006.01)
(Continued)

(52) U.S. Cl.
CPC ......... *G02B 6/03622* (2013.01); *G02B 6/032* (2013.01); *G02B 6/03694* (2013.01);
(Continued)

(58) Field of Classification Search
CPC ............... G02B 6/03622; G02B 6/032; G02B 6/03694; G02F 1/383
(Continued)

(56) References Cited

U.S. PATENT DOCUMENTS 4,071,383 A * 1/1978 Nagata .................. C23C 14/048
117/105
4,247,862 A * 1/1981 Klein ................ H01L 21/26513
257/297
(Continued)

OTHER PUBLICATIONS

Yadav, et al., "Giant enhancement of the second harmonic generation efficiency in poled multilayered silica glass structures", Optics Express, vol. 19, No. 27, Dec. 19, 2011, p. 26975-p. 26983. [Cited in Parent].
(Continued)

*Primary Examiner* — Akm E Ullah
(74) *Attorney, Agent, or Firm* — Baker Botts L.L.P.; Michael A. Sartori

(57) ABSTRACT

An embodiment of the invention relates to an optical device which is capable of realizing a secondary nonlinear optical phenomenon. The optical device is a fiber-type optical device which is comprised of glass containing $SiO_2$, and includes a core region, a first cladding region, and a second cladding region. At least a part of a glass region configured by the core region and the first cladding region has such a repetition structure that a first section serving as a poled crystal region and a second section serving as an amorphous region are alternately disposed along a longitudinal direction of the optical device.

8 Claims, 13 Drawing Sheets

Related U.S. Application Data continuation of application No. PCT/JP2016/087914, filed on Dec. 20, 2016.

(51) Int. Cl.
*G02F 1/383* (2006.01)
*G02B 6/032* (2006.01)

(52) U.S. Cl.
CPC .......... *G02F 1/383* (2013.01); *C03B 2201/31* (2013.01); *C03B 2201/40* (2013.01)

(58) Field of Classification Search
USPC ........................................................ 385/126
See application file for complete search history.

(56) References Cited

U.S. PATENT DOCUMENTS

| | | | |
|---|---|---|---|
| 4,851,025 | A | 7/1989 | Siefert et al. |
| 5,877,530 | A * | 3/1999 | Aronowitz ........ H01L 21/28114 257/344 |
| 5,946,439 | A | 8/1999 | Terasawa et al. |
| 6,360,565 | B1 | 3/2002 | Christoff et al. |
| 6,687,439 | B1 | 2/2004 | Endo et al. |
| 9,952,382 | B2 | 4/2018 | Hayashi |
| 10,468,609 | B2 | 11/2019 | Sato et al. |
| 10,509,161 | B2 | 12/2019 | Shimada et al. |
| 2001/0028775 | A1 | 10/2001 | Hasegawa et al. |
| 2004/0151467 | A1 | 8/2004 | Ishikawa et al. |
| 2005/0058418 | A1 | 3/2005 | Prasad et al. |
| 2007/0065084 | A1 | 3/2007 | Prasad et al. |
| 2019/0041575 | A1 | 2/2019 | Nagano et al. |
| 2019/0317380 | A1 | 10/2019 | Nagano et al. |

OTHER PUBLICATIONS

De Lucia, et al., "Optical fiber poling by induction", Optics Letters, vol. 39, No. 22, Nov. 15, 2014. [Cited in Parent].
Fejer et al., "Quasi-Phase-Matched Second Harmonic Generation: Tuning and Tolerances", IEEE Journal of Quantum Electronics, Nov. 1992, vol. 28, No. 11, p. 2631-p. 2654. [Cited in Parent].
Mizuuchi et al., "Broadening of the Phase-Matching Bandwidth in Quasi-Phase-Matched Second-Harmonic Generation", IEEE Journal of Quantum Electronics, Jul. 1994, vol. 30 No. 7, p. 1596-p. 1604. [Cited in Parent].
Fujimura et al., "Tuning Bandwidth Enhancement in Waveguide Optical Second Harmonic Generation Device Using Phase-Reversed Quasi-Phasematching Grating", The Transactions of the Institute of Electronics, Information and Communication Engineers C-I, Oct. 25, 1994 vol. J77-C1 No. 10, p. 536-p. 541. [Cited in Parent].
Zhu et al., "Quasi-Phase-Matched Third-Harmonic Generation in a Quasi-Periodic Optical Superlattice", Science, Oct. 31, 1997 vol. 278 No. 5339. [Cited in Parent].
Canagasabey et al., "High-average-power second-harmonic generation from periodically poled silica fibers", Optics Letters,vol. 34,No. 16, Apr. 15, 2009, p. 2483-p. 2485. [Cited in Parent].
Fokine, et al., "Integrated fiber Mach-Zehnder interferometer for electro-optic switching", Optics Letters , Sep. 15, 2002, vol. 27, No. 18, p. 1643-p. 1645. [Cited in Parent].
Ohara et al., "Space-selectively crystallized fiber with second-order optical nonlinearity for variable optical attenuation", Optics Letters, Apr. 1, 2009 vol. 34, No. 7, p. 1027-p. 1029. [Cited in Parent].
Ohara et al., "Variable Optical Attenuation using space-selectively crystallized fiber with second-order optical nonlinearity", ECOC 2008, Sep. 2008. [Cited in Parent].
Yamazaki et al., "Surface crystallization of Fresnoite-type crystallized glasses with large thickness", Journal of the Ceramic Society of Japan, 2011 vol. 119, No. 10, p. 757-p. 762. [Cited in Parent].
Yamazaki et al., "Ultra-low propagation tosses in fresnoite-type precipitated crystallized glasses", Applied Physics Letters, 2014 vol. 104, 031901, p. 031901-1-p. 031901-5. [Cited in Parent].
Takahashi et al., "Parasitic amorphous on single-domain crystal: Structural observations of silicate glass-ceramics", Scientific Reports, Jan. 28, 2013, p. 1-p. 5. [Cited in Parent].
Takahashi et al., "Opticai second order rionlinearity of transparent Ba2TiGe2O8 crystallized glasses", Applied Physics Letters , Jul. 8, 2002, vol. 81, No. 2, p. 223-p. 225. [Cited in Parent].
Takahashi et al., "Large second-order optical nonlinearities of fresnoite-type crystals in transparent surface-crystallized glasses", Journal of Applied Physics, Apr. 1, 2004, vol. 95, No. 7, p. 3503-p. 3508. [Cited in Parent].
Takahashi et al., "Perfect surface crystallization and parasitic structures in nonstoichiometric glass-ceramics: Mico-/nanoscopic aspects," Applied Physics Letters, 2013, vol. 102, p. 191903-1-p. 191903-4. [Cited in Parent].

\* cited by examiner

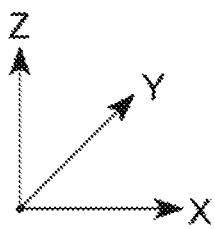
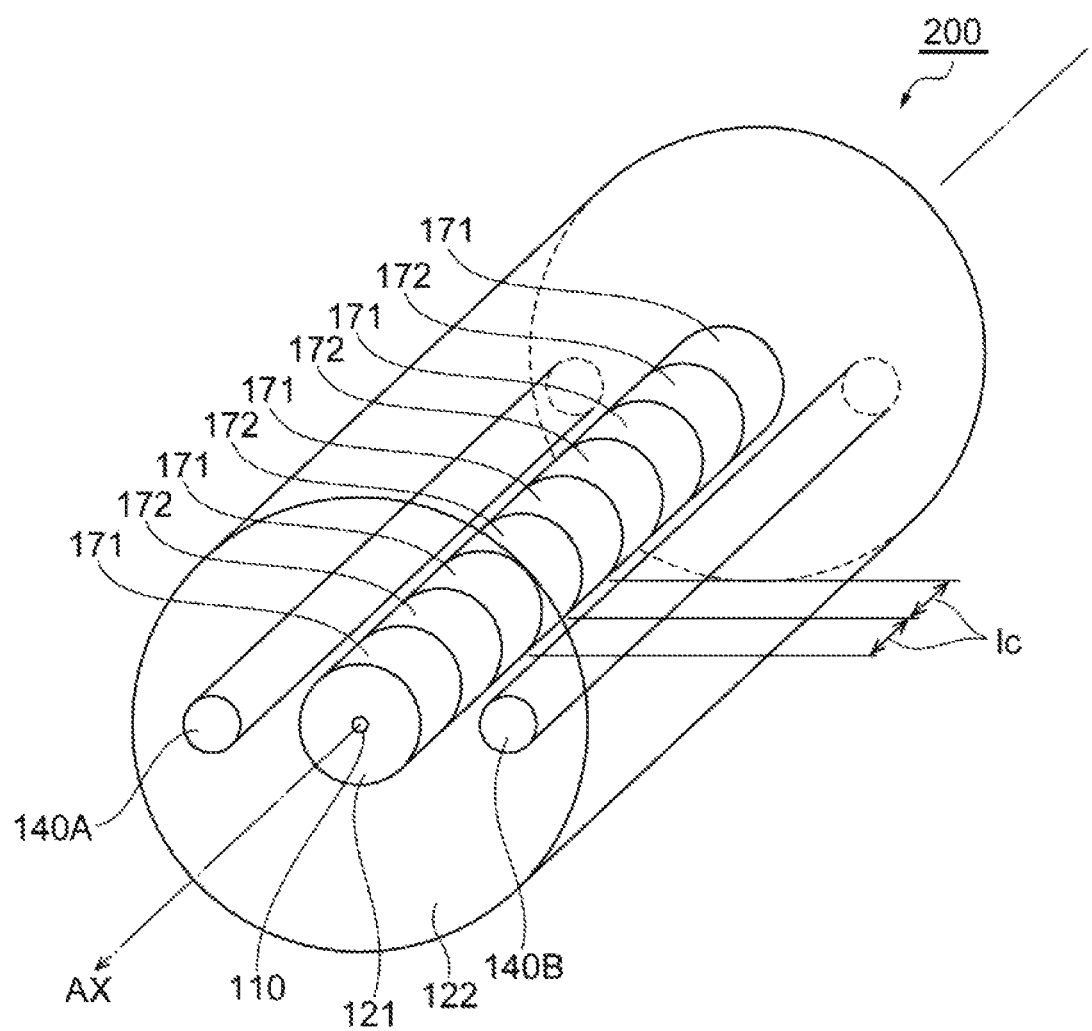

OPTICAL DEVICE AND METHOD FOR MANUFACTURING OPTICAL DEVICE

CROSS-REFERENCE TO RELATED APPLICATIONS

This application is a continuation application of PCT/JP2016/087914 claiming the benefit of priority of the Japanese Patent Application No. 2015-251286 filed on Dec. 24, 2015, the entire contents of which are incorporated herein by reference.

TECHNICAL FIELD

The present invention relates to an optical device and a method for manufacturing the optical device.

BACKGROUND ART

Ferroelectric optical crystals such as a $LiNbO_3$ (LN) crystal, a $KTiOPO_4$ (KTP) crystal, a $LiB_3O_5$ (LBO) crystal, and a $\beta\text{-}BaB_2O_4$ (BBO) crystal are mainstreams of a material used in an optical device where a secondary nonlinear optical phenomenon is employed. The optical device using these crystals has been developed in wide application fields based on wavelength conversion. For example, the optical device is used in a laser processing field, an optical communication field, and a measuring field.

In the laser processing field, the optical device is shortened in wavelength using a second harmonic generation (SHG) of an optical fiber laser. Since the diameter of a beam spot of the second harmonic becomes smaller than that of a fundamental waveform, the optical device is used in a fine laser processing. In the optical communication field, the optical device is used to integrally convert the wavelengths of a C-band WDM signal to an L-band WDM signal in order to effectively utilize a wavelength resource of the WDM signal. In the measuring field, the optical device is used as a light source which generates a terahertz light beam to observe intermolecular vibrations caused by hydrogen bonding.

Recently, compound semiconductor crystals such as GaAs, CaP, GaN, CdTe, ZnSe, and ZnO are also used as a material of the optical device which uses the secondary nonlinear optical phenomenon. These materials have a large secondary nonlinear optical constant and as well draw attention as a material of a secondary-order nonlinear device as there is developing a technology of manufacturing a periodically-poled structure which is essential in a secondary nonlinear optical device.

A scheme of the wavelength conversion may be classified into two fields of a quasi-phase matching (QPM) on the basis of the periodically poling and an angle phase matching. The quasi-phase matching in these fields can generate various phase matching wavelengths by designing an appropriate poling pitch. The wavelength conversion can be made over the entire transparent region of the material. In addition, since the quasi-phase matching has no work-off angle caused by the angle phase matching, a beam quality is excellent, and an interaction length can be made long. Therefore, the quasi-phase matching is a method which is suitable for a high efficiency and for suppressing a coupling loss, and is effective in processing and measuring.

CITATION LIST

Non Patent Literature

Non Patent Document 1: Opt. Lett., Vol. 34, No. 16 (2009) p. 2483

Non Patent Document 2: Opt. Express, Vol. 19, No. 27 (2011) p. 26975

Non Patent Document 3: Applied Physics, Vol. 83, No. 7 (2014) p. 560

Non Patent Document 4: Ceramics, Vol. 49, No. 7 (2014) p. 604

Non Patent Document 5: Opt. Lett., Vol. 39, No. 22 (2014) p. 6513

Non Patent Document 6: IEEE J. Quantum Electron., Vol. 28, Issue. 11 (1992) p. 2631

Non Patent Document 7: Journals of The Institute of Electronics, Information and Communication Engineers (IEICE) C-I J77 (1994) p. 536

Non Patent Document 8: IEEE J. Quantum Electron., Vol. 30, Issue. 7 (1994) p. 1596

Non Patent Document 9: Science Vol. 278 (1997) p. 843

SUMMARY OF INVENTION

Technical Problem

After studying the optical device of the related art, the inventor has found out the problems as follows. In other words, when the optical device using the ferroelectric optical crystal or a compound semiconductor crystal is combined with the optical fiber as a module, there is a need to insert a condensing or magnifying lens between the optical device and the optical fiber. In such a configuration, the coupling loss is increased, and a spatial optical system is necessary depending on an application field of a wavelength conversion. An alignment becomes complicated as the number of components is increased, and thus the device is increased in size. Further, there easily occurs a problem such as degradation in performance by contamination of a lens surface. In this way, it cannot be said that the secondary nonlinear optical device of the related art and the optical fiber are matched well.

On the other hand, since the optical fiber (silica-based glass fiber) comprised of a silica-based glass is configured by an amorphous material, the utilization is limited to a third-order nonlinear optical effect, but hardly employed in a high-efficient wavelength conversion where a secondary nonlinear optical effect is used.

The invention has been made to solve the above problems, and an object thereof is to provide a fiber-type optical device and a method for manufacturing the optical device which is capable of realizing the secondary nonlinear optical phenomenon.

Solution to Problem

The optical device according to the embodiment is a fiber-type optical device comprised of glass containing $SiO_2$, and includes a core region, a first cladding region, and a second cladding region. The core region extends along a longitudinal direction of the optical device. The first cladding region surrounds the core region, and has a refractive index lower than that of the core region. The second cladding region surrounds the first cladding region, and has a refractive index lower than that of the core region. In order to solve the above problems, at least a part of a glass region constituted by the core region and the first cladding region has such a repetition structure that a first section and a second section are alternately disposed along the longitudinal direction. Further, the first section is a crystal region which is poled in a predetermined direction perpendicular to the longitudinal direction. The second section is an amorphous region or another crystal region which is poled in a direction different from the crystal region of the first section.

Advantageous Effects of Invention

According to the embodiment, it is possible to provide a fiber-type optical device which is capable of realizing a secondary nonlinear optical phenomenon.

BRIEF DESCRIPTION OF DRAWINGS

FIG. 9 is a diagram illustrating a configuration of the optical device 200 according to the second embodiment.

DESCRIPTION OF EMBODIMENTS

Description of Embodiments

Figure 1:
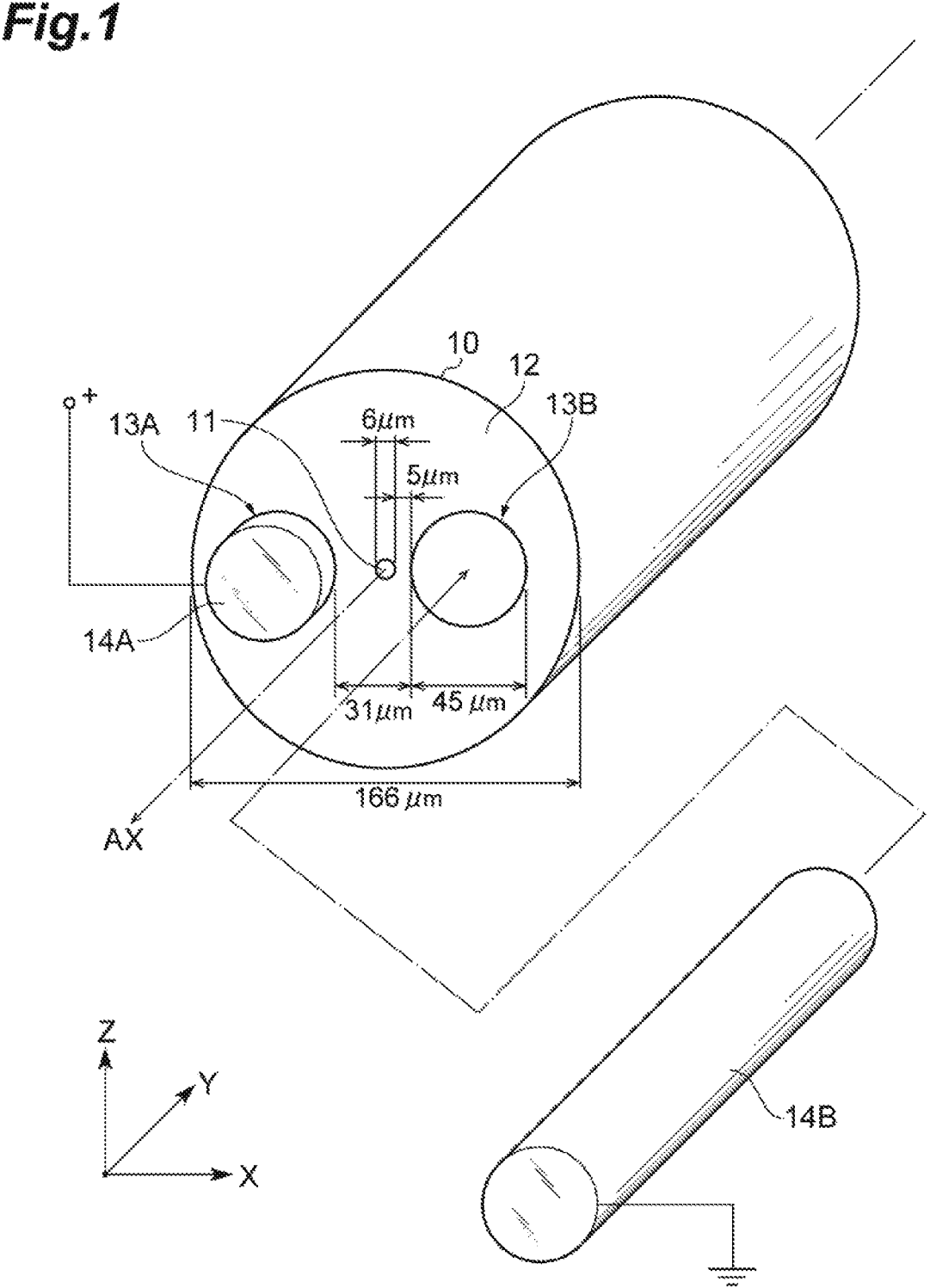
FIG. 1 is a diagram illustrating a cross-sectional structure of an optical device 10 according to a first comparative example.

First, embodiments of the present application will be described individually.

(1) An optical device according to this embodiment is a fiber-type optical device comprised of glass containing $SiO_2$, and includes a core region, a first cladding region, and a second cladding region. The core region extends along a longitudinal direction of the optical device. The first cladding region surrounds the core region, and has a refractive index lower than that of the core region. The second cladding region surrounds the first cladding region, and has a refractive index lower than that of the core region. As an aspect of the embodiment, at least in a portion of a glass region constituted by the core region and the first cladding region, a first section of a polarization-oriented crystal region (poled crystal region) and a second section of an amorphous region are alternately and repeatedly disposed along the longitudinal direction. In addition, as an aspect of the embodiment, the first section of a poled crystal region and the second section of another crystal region poled in a direction different from the first section may be alternately and repeatedly disposed at least in a portion of the glass region along the longitudinal direction.

(2) Further, a portion of the repetition structure in the glass region may be any one of a portion configured by the core region or only by part of the core region, a portion configured by the first cladding region or only by part of the first cladding region, and a portion over from the core region or part of the core region to the first cladding region or part of the first cladding region. In addition, the repetition structure is defined by a repetition period. One period of the repetition period is defined by a length of the region which is configured by the adjacent first and second sections along the longitudinal direction.

(3) As an aspect of the embodiment, the crystal region of the first section may contain a metal element as a dopant to accelerate glass crystallization. In this case, Ti is desirably used as a metal element. In addition, as an aspect of the embodiment, the crystal region of the first section may contain a metalloid element as a dopant to accelerate glass crystallization. In this case, Ge is desirably used as a metalloid element. Further, as an aspect of the embodiment, the crystal region of the first section may contain a univalent or divalent metal element as a dopant to suppress devitrification. In this case, Sr or Ba is desirably used as a univalent or divalent metal element.

(4) As an aspect of the embodiment, the repetition structure may have a single repetition period along the longitudinal direction. In addition, as an aspect of the embodiment, the repetition structure along the longitudinal direction may be a chirp period (a periodic pattern in which a section length corresponding to one period is increased and decreased repeatedly along the longitudinal direction), a period in which a plurality of single different periods are combined), or a period based on a Fibonacci sequence and a Barker sequence.

(5) As an aspect of the embodiment, the repetition structure may be provided over the core region and the first cladding region. In this case, the repetition structure does not need to be provided all over the core region. Similarly, the repetition structure does not need to be provided all over the first cladding region. As an aspect of the embodiment, a length along the longitudinal direction of the first section desirably falls within a range of 1 μm to 1,000 μm.

(6) As an aspect of the embodiment, the holes may be provided to extend along the longitudinal direction in a state of interposing the crystal region of the first section in the second cladding region. In this case, the holes are disposed on a straight line parallel or perpendicular to the polarization-orientation in the crystal region of the first section in a cross section of the optical device perpendicular to the longitudinal direction.

(7) As an aspect of the embodiment, each conductive region may be provided to extend along the longitudinal direction in the second cladding region in a state of interposing the crystal region of the first section. In this case, the conductive regions are disposed on a straight line parallel or perpendicular to the polarization-orientation of the crystal region of the first section in a cross section of the optical device perpendicular to the longitudinal direction. In addition, as an aspect of the embodiment, each of the conductive regions may be a region which surrounds a stress applying region extending along the longitudinal direction and to which a conductive amorphous oxide semiconductor is doped. Further, the stress applying region desirably contains $B_2O_3$. The amorphous oxide semiconductor is desirably $In_2O_3$ or ZnO. In addition, a transparent wavelength range in which a transmittance of the amorphous oxide semiconductor is equal to or more than 60% is desirably 400 nm to 1100 nm.

(8) A method for manufacturing an optical device according to the embodiment forms the repetition structure in a predetermined region of an optical fiber. As an aspect, the method for manufacturing the optical device includes a preparation process of preparing an optical fiber, a temperature adjusting process, and a section forming process. The optical fiber prepared in the preparation process is comprised of glass containing $SiO_2$, and includes the core region, the first cladding region, and the second cladding region. The core region extends along the longitudinal direction of the optical fiber. The first cladding region surrounds the core region, and has a refractive index lower than that of the core region. The second cladding region surrounds the first cladding region, and has a refractive index lower than that of the core region. In addition, a doped region containing a dopant for accelerating the glass crystallization is continuously provided along the longitudinal direction in at least part of a glass region constituted by the core region and the first cladding region. In the temperature adjusting process, a surface temperature of the optical fiber is kept to fall within a range from 100° C. to 800° C., or a range of 100° C. to 400° C. In the section forming process, an electric field is formed to pass through the doped region in the middle of or after an intermittent irradiation of a laser beam to the doped region of the prepared optical fiber. With this configuration, the structure that the first section of the poled crystal region and the second section of the amorphous region are alternately disposed along the longitudinal direction is formed in the doped region. Further, in the section forming process, the intermittent irradiation of the laser beam is performed by intermittently irradiating the doped region with the laser beam along the longitudinal direction so as to form the repetition structure in the doped region. In addition, the electric field is formed such that a potential gradient is formed in the doped region along a direction perpendicular to the longitudinal direction.

(9) As an aspect of the embodiment, the electric field in the section forming process is desirably formed such that the potential gradient is formed in the doped region by applying a voltage between two points interposing the doped region along a direction perpendicular to the longitudinal direction. In addition, as an aspect of the embodiment, when the electric field is formed in the section forming process, an electron beam is generated by a cathode supplied with a predetermined current, and accelerated at a predetermined accelerating voltage to irradiate the optical fiber so as to form an electric charge reservoir in the second cladding region of the optical fiber. Then, the potential gradient may be formed by disposing an electrode on the opposite side to the electric charge reservoir with respect to the doped region.

(10) The method for manufacturing the optical device according to the embodiment may include, as an aspect, a crystal region forming process and the section forming process besides the preparation process and the temperature adjusting process. In the crystal region forming process, a first electric field is formed to pass through the doped region in the middle of or after a continuous irradiation of the laser beam to the doped region of the prepared optical fiber. With this configuration, in the crystal region forming process, a first crystal region which is continuous along the longitudinal direction and oriented in polarization is formed in the doped region. Further, in the crystal region forming process, the continuous irradiation of the laser beam is configured such that the doped region is continuously irradiated with the laser beam along the longitudinal direction to form the first crystal region which is continuous in the doped region. In addition, the formation of the first electric field is configured such that the potential gradient is formed in the doped region along a first direction perpendicular to the longitudinal direction. On the other hand, in the section forming process, a second electric field passing through the first crystal region is formed in the middle of or after the intermittent irradiation of the laser beam with respect to the first crystal region formed in the crystal region forming process. With this configuration, a repetition structure in which the first section (a part of the first crystal region) and the second section (a second crystal region poled in a direction different from the first crystal region) are alternately disposed along the longitudinal direction is formed in the doped region. Further, in the section forming process, the intermittent irradiation of the laser beam is configured such that the doped region is intermittently irradiated with the laser beam along the longitudinal direction to form the repetition structure in the doped region. In addition, the formation of the second electric field is configured such that the potential gradient is formed in the doped region along a second direction which is perpendicular to the longitudinal direction and different from the first direction.

(11) As an aspect of the embodiment, the formation of the first electric field in the crystal region forming process may be configured such that a first voltage Va is applied between two points interposing the doped region along the first direction to form the potential gradient in the doped region. In addition, the formation of the second electric field in the section forming process may be configured such that a second voltage Vi which has the opposite polarity to the first voltage Va and an absolute value smaller than that of the first voltage Va is applied between two points interposing the doped region to form the potential gradient in the doped region along the second direction. In addition, on the other hand, as an aspect of the embodiment, the formation of the first electric field in the crystal region forming process may be configured such that an electron beam is generated by a cathode supplied with a current of a first current value and accelerated at a predetermined accelerating voltage to irradiate the optical fiber from the first direction so as to form a first electric charge reservoir in the second cladding region of the optical fiber, and then a first electrode is disposed on the opposite side to the first electric charge reservoir with respect to the doped region so as to form the potential gradient in the doped region. In this case, the formation of the second electric field in the section forming process may be configured such that the electron beam is generated by a cathode supplied with a current of a second current value smaller than the first current value and accelerated at a predetermined accelerating voltage to irradiate the optical fiber from the second direction so as to form a second electric charge reservoir in the second cladding region of the optical fiber, and then a second electrode is disposed on the opposite side to the second electric charge reservoir with respect to the doped region so as to form the potential gradient in the doped region.

(12) As an aspect of the embodiment, a maximum diameter of irradiation area of the electron beam desirably falls within a range of 1 µm to 1,000 µm. In addition, as an aspect of the embodiment, the accelerating voltage desirably falls within a range of 1 kV to 10 MV. Further, as an aspect of the embodiment, the cathode is desirably supplied with a current within a range 1 nA to 10 mA where the first and second current values are included.

(13) Further, in the method for manufacturing the optical device according to the embodiment, the laser beam irradiating the optical fiber desirably has a wavelength within a range of 100 nm to 1600 nm In particular, as an aspect of the embodiment, a pulse-oscillating laser source is desirably used for both the intermittent irradiation and the continuous irradiation of the laser beam. In this case, a pulse width desirably falls within a range of 10 ps to 100 ms. In addition, as an aspect of the embodiment, a CW-oscillating laser source may be used in both the intermittent irradiation and the continuous irradiation of the laser beam. Further, as an aspect of the embodiment, a voltage to be applied between two points interposing the doped region desirably falls within a range of −20,000 V to 20,000 V.

Hereinbefore, each of the aspects listed in Description of Embodiments is applicable to each of the other aspects or to a combination of the other aspects.

DETAILED DESCRIPTION OF THE INVENTION

Hereinafter, a specific structure of an optical device and a method for manufacturing the optical device according to the embodiments will be described in detail with reference to the accompanying drawings. Further, the invention is not limited to the embodiments, but includes meanings which are indicated by the claims and equivalent to the claims, and all the changes within the claims. In addition, the same elements in the description of the drawings will be attached with the same symbol, and a redundant description will be omitted.

In Non Patent Document 1, there is disclosed a fiber-type optical device which can realize a secondary nonlinear optical phenomenon. In the following, the optical device disclosed in Non Patent Document 1 will be called "the optical device according to the first comparative example". FIG. 1 is a diagram illustrating a cross-sectional structure of the optical device 10 according to the first comparative example.

As illustrated in FIG. 1, the optical device 10 includes a single-mode optical fiber (hereinafter, referred to as "SMF") which includes a core region 11 containing Ge and a cladding region 12. In the cladding region 12 of the SMF, a pair of holes 13A and 13B extending in a longitudinal direction (a direction along an optical axis AX in FIG. 1) of the SMF are provided to interpose the core region 11. A diameter (cladding shape) of the SMF is 166 μm, a diameter of the core region 11 is 6 μm, a diameter of each of the holes 13A and 13B is 45 μm, a gap between the core region 11 and the hole 13B is 5 μm, and a gap between two holes 13A and 13B is 31 μm. In Non Patent Document 1, there is disclosed a relation between a fundamental wavelength and a QPM Period. For example, the QPM Period of the optical device 10 may be set to about 65 μm in order to set the fundamental wavelength to 1,550 nm and a second harmonic to 775 nm.

Since a polarization-induction by thermal poling and a periodic poling-erasure by UV irradiation are performed, the optical device 10 realizes a secondary nonlinear optical effect. As a result, the second harmonic is successfully generated with an incident wavelength of 1.5415 μm. Further, the thermal poling is a method in which electrodes 14A and 14B are inserted to the pair of holes 13A and 13B as illustrated in FIG. 1 in a state where a temperature (for example, a surface temperature) of the optical fiber is kept within a range of 210° C. to 300° C., and are kept in a state where a high voltage is applied between these electrodes 14A and 14B for a certain period of time. Further, FIG. 1 illustrates a state where the electrodes 14A and 14B are respectively inserted to the holes 13A and 13B of the SMF. However, the electrodes 14A and 14B are removed from the holes 13A and 13B after the thermal poling. Through the thermal poling, a dipole generated by oxygen ions (negative ions) and positive ions caused by a depletion layer immediately below the positive electrode is formed in part of the core region 11, so that a strong electric field is locally generated and a secondary nonlinear optical constant is realized. In the UV irradiation performed subsequently to the thermal poling, an UV beam is periodically emitted along the longitudinal direction of the optical fiber to remove the dipole of the irradiated region (the periodic poling-erasure).

The optical device 10 has a periodically-poled structure in which a region (a UV beam non-irradiation region) which is polarized in a constant direction and a region (a UV beam irradiation region) which is not polarized are alternately provided along the longitudinal direction, and can realize a wavelength conversion using a quasi-phase matching.

In addition, Non Patent Document 2 also discloses a fiber-type optical device which can realize the secondary nonlinear optical phenomenon. In the following, the optical device disclosed in Non Patent Document 2 will be called "the optical device according to a second comparative example".

Similarly to FIG. 1, the optical device according to the second comparative example includes the SMF which includes the core region and the cladding region. A pair of holes extending in the longitudinal direction of the SMF are provided in the cladding region of the SMF to interpose the core region. The optical device according to the second comparative example is manufactured by performing the polarization-induction by the above-described thermal poling which is performed in a state where the electrode is inserted to the pair of holes and the periodic poling-erasure by the UV irradiation.

The core region of the optical device according to the second comparative example has a structure in which a plurality of layers containing Ge are concentrically formed. Compared to the optical device 10 according to the first comparative example, the optical device according to the second comparative example is reported to achieve 200 times the conversion efficiency.

The optical devices according to the first and second comparative examples vary in a polarization strength (the nonlinear optical constant) depending on the UV irradiation even after being manufactured with a desired characteristic. Therefore, a wavelength conversion efficiency is lowered depending on an irradiation period and an amount of irradiation beams containing the UV beam and solar light, and thus there is a problem in stability.

Figure 2:
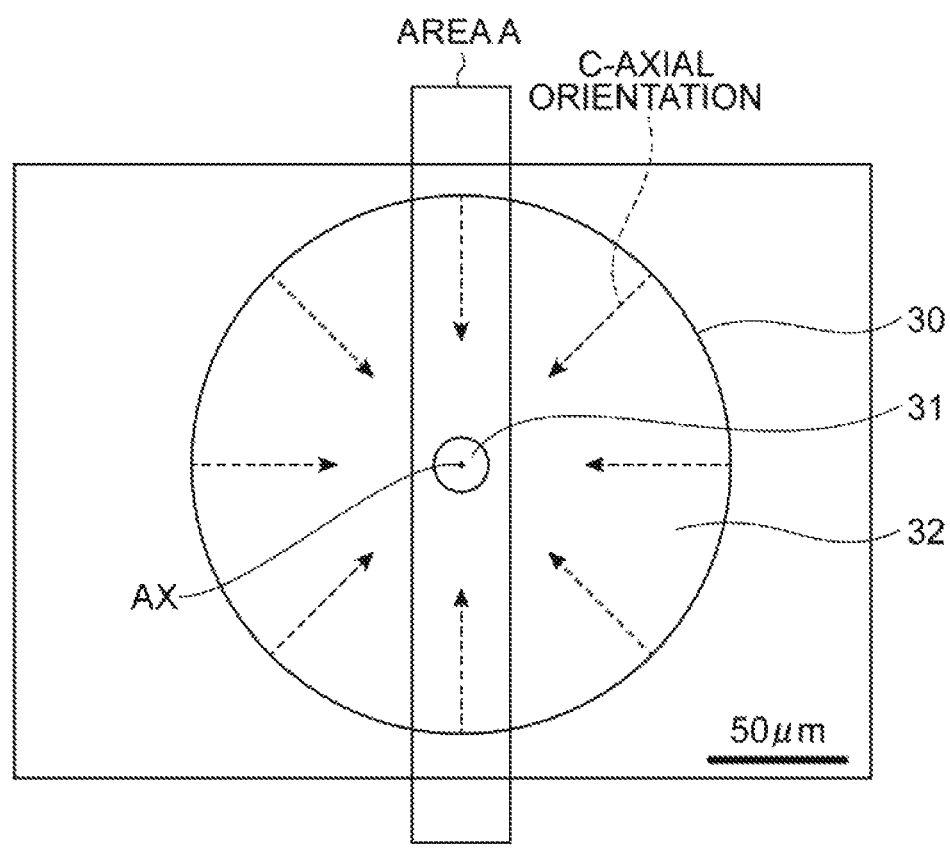
FIG. 2 is a conceptual diagram illustrating a cross section of an optical device 30 according to a third comparative example.

Non Patent Document 3 also discloses a fiber-type optical device which can realize the secondary nonlinear optical phenomenon. In the following, the optical device disclosed in Non Patent Document 3 will be called as "the optical device according to a third comparative example". FIG. 2 is a conceptual diagram of a cross section of an optical device 30 according to the third comparative example.

The optical device 30 includes the SMF which includes a core region 31 and a cladding region 32. A specific material is doped to the cladding region 32 to crystallize the cladding region 32 so as to realize a secondary nonlinearity.

In the optical device 30 according to the third comparative example, fresnoite ($Ba_2TiSi_2O_8$) of the material doped to the cladding region 32 is a titanosilicate mineral having a structure of hexagonal system, and has a spontaneous polarization due to a lack of inversion symmetry. In addition, a crystal ($Sr_2TiSi_2O_8$, $Ba_2TiGe_2O_8$) deprived from fresnoite also has the spontaneous polarization. Since the fresnoite crystals have the spontaneous polarization, these crystals show nonlinear optical characteristics. In addition, it is also reported that a $BaO-TiO_2-GeO_2$ based glass and a $SrO-TiO_2-SiO_2$ based glass have a fresnoite phase are showed the nonlinear optical characteristics.

The above-described various materials are doped to a silica-based glass fiber, and continuously crystallized along the longitudinal direction of the fiber by laser assistance. Therefore, a radial polarization ordered structure is obtained as illustrated with arrows facing the core region 31 in FIG. 2. In such a crystallized glass, there is a concern about devitrification caused by the crystallization. However, the optical device disclosed in Non Patent Document 4 is configured to suppress a difference of the refractive index between a crystal phase and a residual glass phase which causes the devitrification so as to achieve transparency.

The optical device 30 according to the third comparative example is poled in a direction heading toward the core region 31, and polarizing directions on both sides with the core region 31 interposed therebetween are inverted to each other in a longitudinal region (Area A in FIG. 2) of which the length of the short side including the core region 31 is about the diameter of the core. With this configuration, since the nonlinearity caused by the polarization-orientation is canceled macroscopically from the optical device 30, the polarization-orientation cannot be utilized as the wavelength conversion. In addition, the optical device 30 is evenly crystallized along the longitudinal direction of the fiber, and thus a phase matching condition necessary for the wavelength conversion cannot be satisfied. As a result, the optical device 30 cannot be used in the wavelength conversion.

The embodiments of the invention can solve the problems of the optical devices according to the first to third comparative examples. In a first embodiment of the invention, a crystal region (first section) and an amorphous region (second section) are alternately formed in the optical fiber along the longitudinal direction of the optical fiber. When or after these first and second sections are formed, the crystal region is selectively poled in one direction over the entire surface or a part of the cross section of the crystal by the above-described electric field forming method. Therefore, there is formed a periodically-poled structure (that is, a structure where the crystal region where the polarization is formed in a certain direction and the amorphous region where the polarization is not formed are alternately disposed) satisfying the quasi-phase matching. Alternatively, in a second embodiment of the invention, a structure in which the polarity of the spontaneous polarization is alternately inverted along the longitudinal direction of the optical fiber is formed in a region where the optical fiber is crystallized. In the polarization inverted by the above-described electric field forming method, the entire surface or only a part of the cross section of the crystal is oriented in one direction, and then a laser beam is intermittently emitted while forming the electric field inverted in voltage polarity of the above-described electric field forming method. The laser beam is appropriately emitted to orient only the laser-emitted region by 91 to 180 degrees relatively to the orientation of the spontaneous polarization.

In the optical device according to the embodiments, the crystal region is poled, so that the secondary nonlinear optical constant is kept as long as the crystal structure is not collapsed. In other words, the optical device according to the embodiment is strong against disturbance such as the UV irradiation, and can make the wavelength conversion with stability. In addition, the optical device according to the embodiment is crystallized in the inner structure, so that the nonlinear optical constant can be improved by about one or two orders compared to the thermal poling to the Ge-doped core region (the conversion efficiency can be greatly improved).

A material structure of the silica-based glass fiber is amorphous. When a voltage is applied from the outside to form a strong electric field in the optical fiber, the polarization-orientation is realized by the dipole caused by impurity ions (the secondary nonlinear optical constant (d constant) appears). However, when no voltage is applied (the electric field in the optical fiber is zero), the polarization-orientation is not kept but collapsed, and the d constant of the second order becomes zero. Further, the efficiency of the wavelength conversion by the secondary nonlinear optical effect is proportional to the square of the d constant. The d constant depends on a physical property of the material, and the conversion efficiency is improved as the d constant is increased. In a case where the d constant is zero, the wavelength conversion cannot be made.

A method for realizing the d constant is as follows. In other words, an optical fiber comprised of glass containing $SiO_2$ is prepared. The optical fiber includes the core region, a first cladding region which surrounds the core region and has a refractive index lower than that of the core region, and a second cladding region which surrounds the first cladding region and has a refractive index lower than that of the core region. In addition, a dopant is doped to at least a part (doped region) of a glass region which is configured by the core region and the first cladding region in order to accelerate the glass crystallization.

As the dopant, a material such as a fresnoite crystal, a $BaO-TiO_2-GeO_2-SiO_2$ based glass, and a $SrO-TiO_2-SiO_2$ based glass is doped to at least a part of the glass region which is configured by the core region and the first cladding region of the optical fiber. The laser-assisted glass crystallization is performed on the doped region. In other words, a rare earth element or a transition metal element is doped to a crystallization target region. The region is heated by absorbing the laser beam to crystallize a laser beam irradiation area. In order to suppress the devitrification caused by crystallization, there is a need to match the refractive indexes between a crystal phase and a residual glass phase. The devitrification can be suppressed by using a $35SrO-20TiO_2-45SiO_2$ based glass (see Non Patent Documents 3 and 4). The nonlinear optical constant in the crystallized doped region is strong against the disturbance (UV beam) and improves the stability.

However, in the scheme of the laser-assisted crystallization, as described above, the polarization-orientation is radially formed toward the center. As illustrated in FIG. 2, the polarizing directions on both sides with the core region interposed therebetween are inverted to each other in the longitudinal region (Area A in FIG. 2) of which the length of the short side including the core region is about the diameter of the core. With this configuration, since the nonlinearity caused by the polarization-orientation is canceled, the polarization-orientation cannot be utilized as the wavelength conversion.

In order to realize a highly efficient wavelength conversion, there is a need to orient the polarization in the same direction over the entire cross-sectional surface or a part of the cross section of the fiber. In the embodiment, for example, a polarization inversing technology is utilized in which the electric field is formed after the laser-assisted crystallization (or a high voltage is applied while heating up the optical fiber), so that the polarization-orientation of Area A is arranged in the same direction. Alternatively, the electric field is formed in the middle of the laser-assisted crystallization, and the crystal is grown while arranging the polarizing direction. Since the poled region has a crystal structure, the polarization-orientation is kept even in a state where a voltage is not applied. Therefore, the secondary nonlinear optical constant is strong against the disturbance and improved in stability.

Figure 3A:
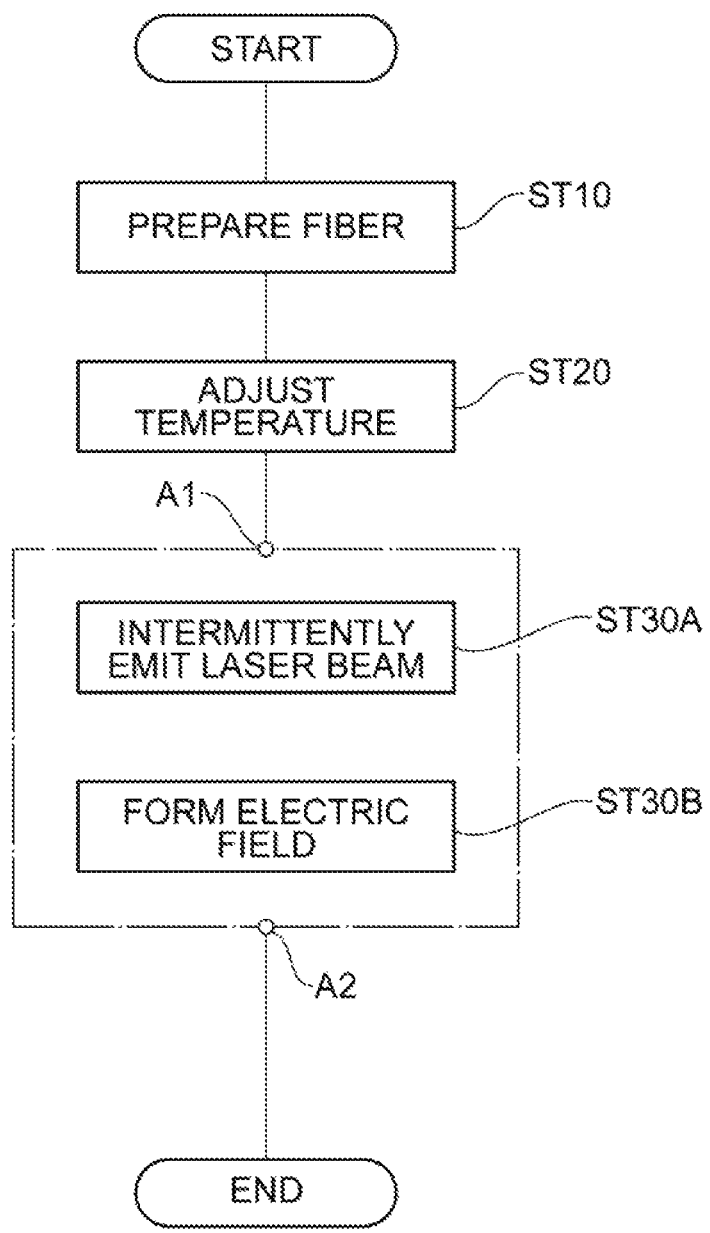
FIG. 3A is a flowchart for describing a method for manufacturing the optical device according to a first embodiment.
Figure 4:
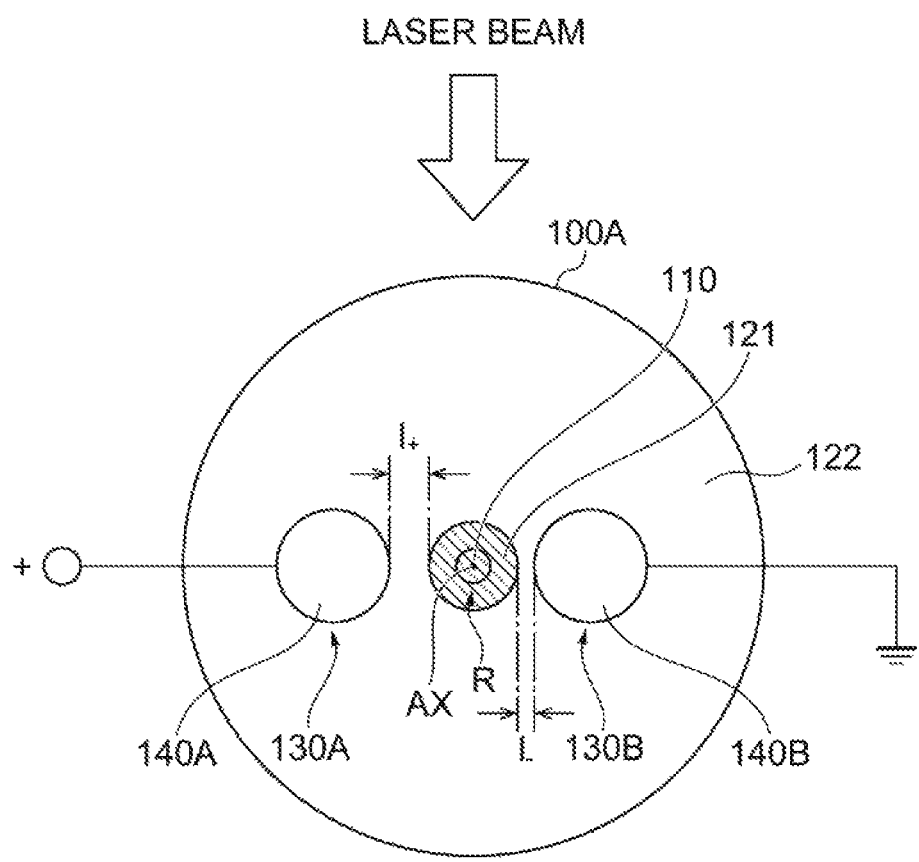
FIG. 4 is a diagram for describing a first method for forming an electric field in an optical fiber.
Figure 5:
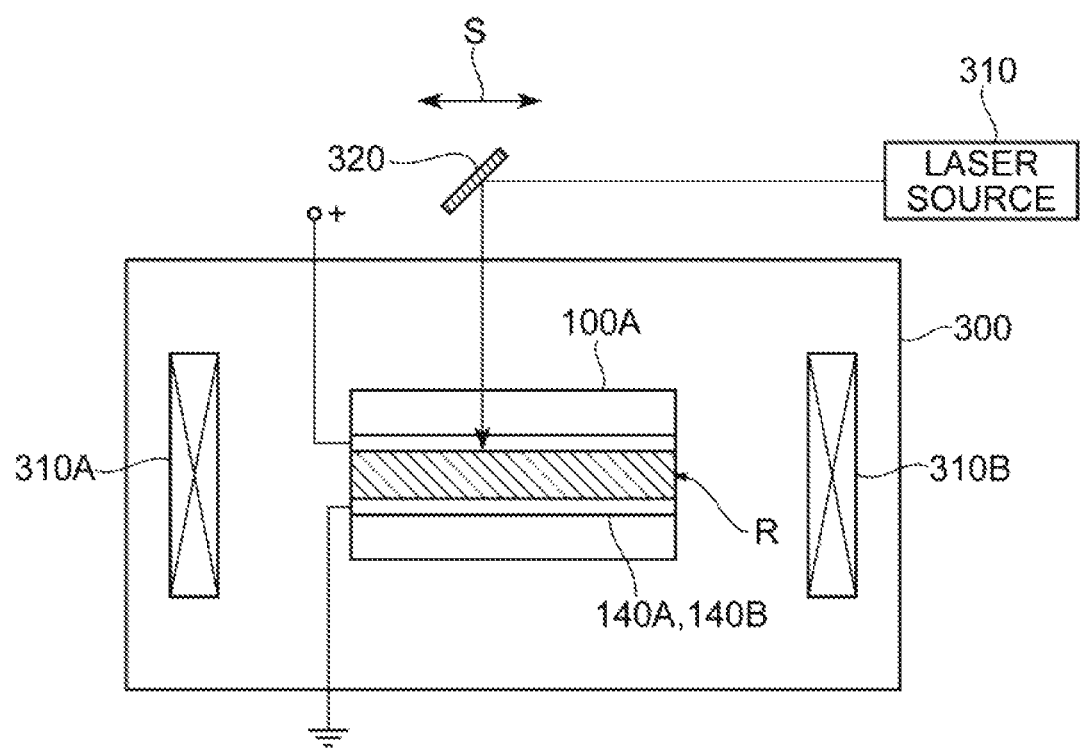
FIG. 5 is a diagram for describing a method for irradiating the optical fiber intermittently or continuously with a laser beam.
Figure 6:
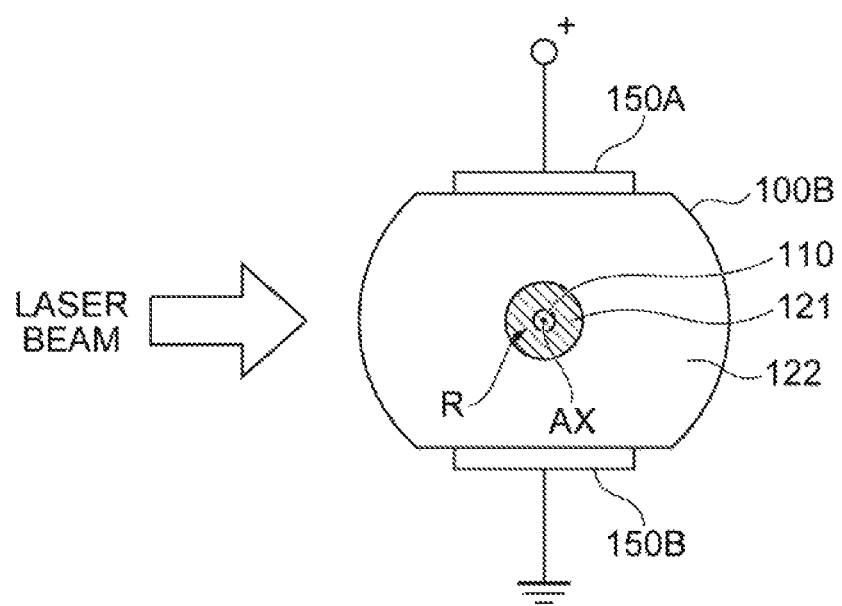
FIG. 6 is a diagram for describing a second method for forming an electric field in the optical fiber.
Figure 7:
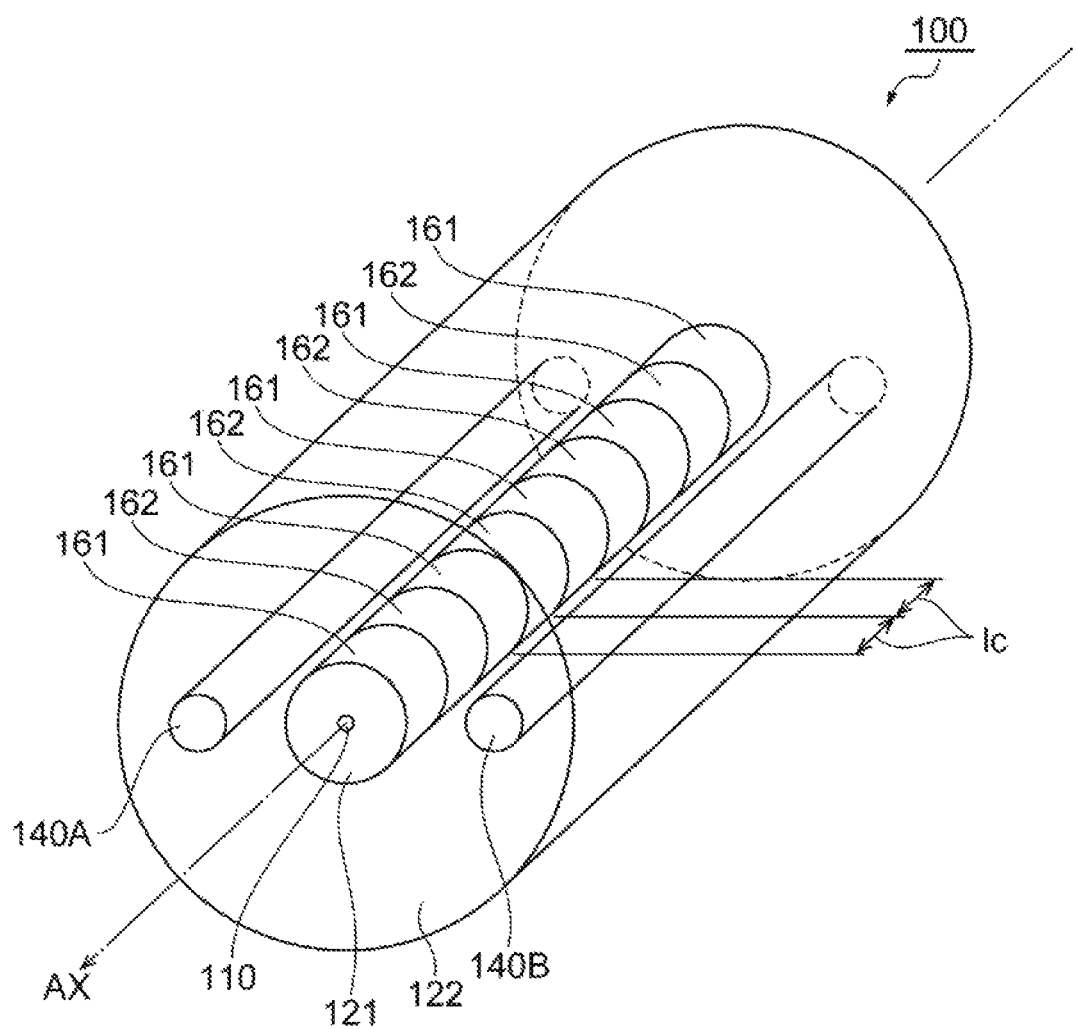
FIG. 7 is a diagram illustrating a configuration of the optical device 100 according to the first embodiment.

Specifically, FIG. 3A is a flowchart for describing a method for manufacturing the optical device according to the first embodiment. Further, FIG. 4 is a diagram for describing a first method for forming the electric field in the optical fiber. FIG. 5 is a diagram for describing a method for irradiating the optical fiber intermittently or continuously with the laser beam. FIG. 6 is a diagram for describing a second method for forming the electric field in the optical fiber. An optical device 100 according to the first embodiment having the structure illustrated in FIG. 7 is obtained by manufacturing the optical device according to the flowchart of FIG. 3A.

First, an optical fiber 100A having the cross-sectional structure illustrated in FIG. 4 is prepared (Step ST10). The prepared optical fiber 100A is an optical fiber comprised of glass containing $SiO_2$. The prepared optical fiber includes a core region 110, a first cladding region 121 which surrounds the core region 110 and has a refractive index lower than that of the core region 110, and a second cladding region 122 which surrounds the first cladding region 121 and has a refractive index lower than that of the core region. In addition, a doped region R doped with a dopant for accelerating the glass crystallization is continuously provided along the longitudinal direction in at least a part (a region illustrated with the shaded area in FIG. 4) of the glass region which is configured by the core region 110 and the first cladding region 121. Further, in the example illustrated in FIG. 4, the doped region R is configured by both the entire core region 110 and the entire first cladding region 121. However, the doped region R may be configured by any one of the entire or a part of the core region 110, the entire or a part of the first cladding region 121, or a portion over from the core region or a part thereof to the first cladding region 121 or a part thereof. In addition, the optical fiber 100A is provided with a pair of holes 130A and 130B which extend along the longitudinal direction (a direction along the optical axis AX of the optical fiber 100A) to interpose the core region 110.

Then, the optical fiber 100A is adjusted in temperature such that the surface temperature falls within a range of 100° C. to 800° C. or a range of 100° C. to 400° C. (Step ST20). The temperature adjustment of Step ST20 and the subsequent processes may be performed in a chamber 300 illustrated in FIG. 5. Further, the chamber 300 is provided with heaters 310A and 310B for keeping the temperature of the optical fiber 100A for a certain period of time. When being stored in the chamber 300, electrodes 140A and 140B are inserted in the pair of holes 130A and 130B of the optical fiber 100A respectively so as to generate a high electric field in the doped region R of the optical fiber 100A.

In a state where the surface temperature is adjusted, the intermittent irradiation of the laser beam (Step ST30A) and the forming of the electric field (Step ST30B) are performed on the optical fiber 100A between timing A1 and timing A2 in FIG. 3A. Further, Step ST30B may be performed after Step ST30A, or may be performed concurrently with Step ST30A.

Specifically, in Step ST30A, as illustrated in FIG. 5, the laser beam from a laser source 310 is intermittently emitted to the doped region R through a reflection mirror 320 which is movable along the longitudinal direction (a direction illustrated with arrow S) of the optical fiber 100A (the surface temperature is kept within a range 100° C. to 800° C. or a range of 100° C. to 400° C. by the heaters 310A and 310B). With this configuration, the repetition structure in which the crystal region (first section) and the amorphous region (second section) are alternately disposed along the longitudinal direction is formed in the doped region R of the optical fiber 100A. On the other hand, in Step ST30B, as illustrated in FIG. 4, the electrodes 140A and 140B are respectively inserted to the pair of holes 130A and 130B provided in the second cladding region 122 of the optical fiber 100A. When a voltage is applied between the pair of electrodes 140A and 140B, the electric field is formed in the core region 110 and the first cladding region 121 forming the doped region R. As a result, the first section periodically disposed in the doped region R becomes the poled crystal region. After the polarization-orientation is completed by forming the electric field, the electrodes 140A and 140B are removed from the holes 130A and 130B. The polarization-orientation left in the amorphous region of the second section is released by the poling erasure performed by the UV irradiation to the doped region R (a light amount smaller than the amount of the UV irradiation which can erase the polarization in the crystal region). As a method for increasing the electric field of the doped region R of FIG. 4, it is effective to asymmetrically layout the holes 130A and 130B at the center of the core region 110. Specifically, there is a method that the positive electrode is disposed near the core region 110, or a negative electrode (a ground electrode in the case of FIG. 4) is disposed near the core region 110. The layout is adjusted within a range of l+/l−=0.1 to 10.

Further, in the electric field forming method (Step ST30B), the electrodes 140A and 140B are inserted to the holes 130A and 130B provided in the optical fiber 100A. However, an optical fiber having a different structure from the optical fiber 100A may be used. For example, in a process of manufacturing a base material of the optical fiber, a conductive glass rod is inserted to a punching region (a portion for the holes 130A and 130B) of the base material of the optical fiber. The electric field forming method may be applied to the optical fiber obtained by drawing the obtained base material of the optical fiber (that is, the optical fiber in which the electrodes 140A and 140B of FIG. 4 is replaced with a conductive region) after the base material of the optical fiber and the inserted glass rod are collapsed. In addition, in a process of manufacturing the base material of the optical fiber, the electric field forming method may be applied to the optical fiber obtained by a rod-in drawing in a state where the conductive glass rod is inserted to the punching region of the base material of the optical fiber. In these methods for manufacturing the optical fiber, the conductive glass rod is drawn to be integrated with the optical fiber to form an electrode. There is no need to remove the electrode after poling. In addition, a pair of electrodes integrated with the optical fiber can apply a stress on the core region. However, the configuration of the integrated electrode is effective in the wavelength conversion since a polarized wave holding optical fiber having double refractivity is applied to the optical device according to the embodiment.

As a material of the glass rod for the electrode, a conductive transparent amorphous oxide semiconductor such as ITO (Sn-doped $In_2O_3$), ZnO, IZO (In-doped ZnO), AZO (Al-doped ZnO), GZO (Ga-doped ZnO), and IGZO (In-Ga-$ZnO_4$) is usable. A transparent wavelength range of a transmittance 60% or more of the amorphous oxide semiconductor desirably falls within a range of 400 nm to 1100 nm. For example, the transparent conductivity is assigned to the vicinity of the glass rod to be a stress imparting portion ($B_2O_3$-doped $SiO_2$) of the polarized wave holding optical fiber so as to be the glass rod for the electrode. Further, the electrode is used to apply a voltage required for realizing the polarization-orientation. Therefore, since the electrodes are separated therebetween by an order of several tens of μm, the current is extremely smaller to be equal to or less than about several pA, there is no problem even when a resistance of the region between the electrodes is high about $10^6$ Ωcm. However, the current value is necessarily made high in order to realize the polarization-orientation in a region between the electrodes having a large cross-sectional area. In this case, a metal electrode is effective. The metal electrode desirably contains Ti, Cu, Al, Au, Ag, Pt, and W.

Further, the second method illustrated in FIG. 6 may be applied as the method for forming the electric field of Step ST30B. Further, FIG. 6 is a diagram for describing the second method for forming the electric field in the optical fiber. In the method for applying the electric field illustrated in FIG. 6, two plate surfaces facing the outer peripheral surface of the second cladding region 122 are formed. An electrode 150 is attached to these two plate surfaces to form an optical fiber 100B. Further, the optical fiber 100B includes the core region 110, the first cladding region 121, and the second cladding region 122 similarly to the optical fiber 100A. There is provided no hole for the insertion of the electrode. A voltage is applied between a pair of electrodes 150A and 150B in a state where the optical fiber 100B is dipped in insulating oil to form the electric field in the core region 110 and the first cladding region 121 positioned between the electrodes. As a result, the polarization-orientation is realized in the doped region R. After the polarization-orientation is completed by forming the electric field, the electrodes 150A and 150B are removed. Further, the electrode is not necessarily disposed on a plate surface obtained by processing the outer peripheral surface of the second cladding region 122 like the optical fiber 100B. For example, a voltage may be applied between the pair of electrodes disposed to interpose the optical fiber including the doped region R.

The first method illustrated in FIG. 4 and the second method illustrated in FIG. 6 may be combined such that one of the electrodes is disposed as a hole in the second cladding region, the other one is disposed on the outer periphery of the optical fiber or on the outer side of the optical fiber, and a voltage is applied between these electrodes. In addition, the method disclosed in Non Patent Document 5 may be used to realize the polarization-orientation.

Further, there is no limit in the voltage to be applied between the pair of electrodes. For example, a negative voltage and a ground voltage may be applied between the electrodes. Alternatively, the ground potential is set to a positively biased voltage, and the negative voltage may be applied between the electrodes. It is important that a high electric field is applied to the crystallization target region. When a voltage is applied, a voltage within a range of −20,000 V to 20,000 V is desirably applied if the optical fiber has a thickness of about a several hundreds of micron order even though it depends on a target thickness to be inverted.

Next, the description will be given about a method for satisfying the phase matching condition for the optical device of the embodiment to operate the wavelength conversion. For example, the wavelength conversion of a second harmonic generation (SHG) will be considered. In general, a material has a refractive index dispersion characteristic in which the refractive index varies according to a wavelength. Therefore, propagation speeds of a fundamental waveform and a wavelength conversion waveform (SH waveform) in the material are different from each other. Even if the material has nonlinearity, the wavelength conversion is not possible.

In order to realize the wavelength conversion, there is a need to arrange the phases of the fundamental waveform and the SH waveform. In this case, a quasi-phase matching (QPM) may be used. When a propagation speed difference Δk between the fundamental waveform and the SH waveform is deviated by π, the quasi-phase matching is performed to inverse the spontaneous polarization and to inverse a sign of the d constant so as to satisfy the phase matching. In other words, when a coherence length lc is set to π/Δk, the SH waveforms are constructively added by inversing the sign of the d constant at every lc, and the SH beam is increased, so that a highly efficient wavelength conversion can be achieved. The QPM method is applied to the phase matching of the optical device according to the embodiment.

FIG. 7 is a diagram illustrating a configuration of the optical device 100 according to the first embodiment which is manufactured according to the flowchart of FIG. 3A. The optical device 100 is a fiber-type optical device comprised of glass containing $SiO_2$. The optical device includes the core region 110, the first cladding region 121 which surrounds the core region 110 and has a refractive index lower than that of the core region 110, and the second cladding region 122 which surrounds the first cladding region 121 and has a refractive index lower than that of the core region 110. The optical device 100 has a repetition structure in which a poled crystal region 161 (first section) where the entire cross section or a part thereof is poled in one direction and an amorphous region 162 (second section) are alternately disposed along the longitudinal direction (a direction matched to the optical axis AX in the drawing) in at least a part of the glass region which is configured by the core region 110 and the first cladding region 121 (the entire glass region in the example of FIG. 7 corresponds to the doped region R). The repetition period is within a range of 1 μm to 1,000 μm. In order to realize a highly efficient wavelength conversion, the lengths in the longitudinal direction of the crystal region 161 and the amorphous region 162 are desirably equal to the coherence length lc (in this case, "repetition period"="length of first section"+"length of second section"=2×"coherence length"). Further, the phase matching condition may be needed to be expanded in bandwidth. In this case, in the repetition period of the repetition structure, it is possible to employ a non-periodic periodically-poled structure (chirp (see Non Patent Document 6), a structure in which a Λ1-period region, a Λ2-period region, a Λ3-period region, . . . , and a periodic region are handled as one segment, and the segments are disposed at a certain interval (see Non Patent Document 8), a period based on the Fibonacci sequence (see Non Patent Document 9), and a period based on the Barker sequence (see Non Patent Document 7)).

The polarization-orientation of the crystal region 161 is a direction connecting the cross sections of the pair of electrodes 140A and 140B which are provided to interpose the core region 110 in the second cladding region 122. Alternatively, at least in the longitudinal region (Area A in FIG. 2) of which the length of the short side including the core region 110 is about the diameter of the core, the polarization-orientation is a direction connecting the cross sections of the pair of electrodes 140A and 140B.

The polarization of the amorphous region 162 becomes zero in the state of no voltage. Alternatively, in a case where there remains unnecessary nonlinear optical constant even in the state of no voltage, the poling erasure can be forcibly performed on the amorphous region 162 by the UV irradiation. Further, in order to perform the poling erasure only on the amorphous region 162 by the UV irradiation, there is needed an amount of irradiation beam less than the amount ($UV_{th}$) of the UV irradiation with which the polarization in the crystal region 161 is erasable. With the amount of the UV irradiation less than $UV_{th}$, only the polarization of the amorphous region can be erased, and the QPM method is established even after the UV irradiation.

Next, the description will be given about a method for manufacturing the optical device according to the second embodiment using the flowchart of FIG. 3B. Further, the first and second methods where the electric field is applied in the optical fiber are similar to the examples of FIGS. 4 and 6. In addition, a method for irradiating the optical fiber intermittently or continuously with the laser beam is similar to the example of FIG. 5. An optical device 200 according to the second embodiment having the structure illustrated in FIG. 9 is obtained by manufacturing the optical device according to the flowchart of FIG. 3B. Further, even in the method for manufacturing the optical device according to the second embodiment, the optical fiber prepared in Step ST10 of FIG. 3B becomes the optical fiber 100A having the cross-sectional structure illustrated in FIG. 4.

Then, the temperature of the optical fiber 100A is adjusted in the chamber 300 illustrated in FIG. 5 such that the surface temperature falls within a range of 100° C. to 800° C. or a range of 100° C. to 400° C. (Step ST20). Further, the electrodes 140A and 140B are inserted to the pair of holes 130A and 130B of the optical fiber 100A stored in the chamber 300 in order to generate a high electric field in the doped region R of the optical fiber 100A.

Figure 3B:
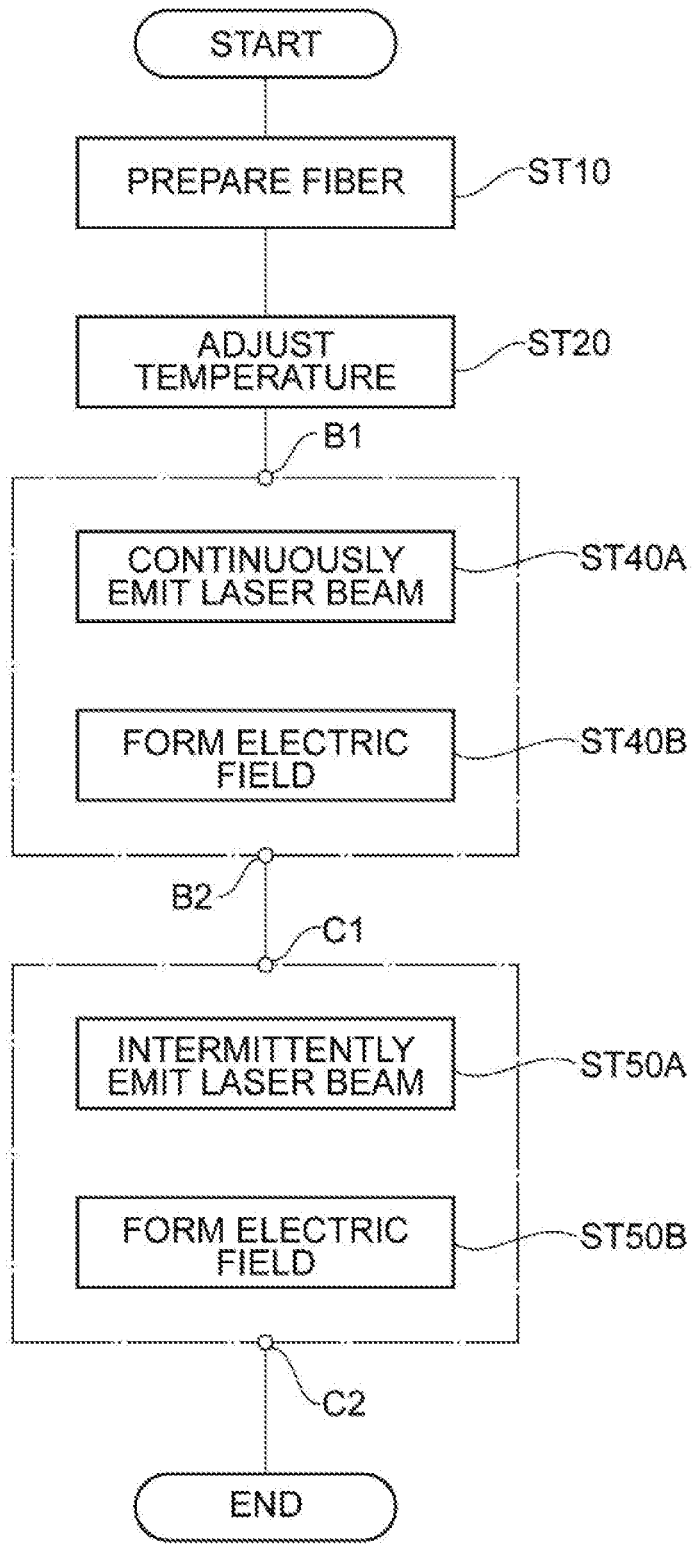
FIG. 3B is a flowchart for describing a method for manufacturing the optical device according to a second embodiment.

In a state where the surface temperature is adjusted, a continuous irradiation (Step ST40A) of the laser beam to form a first crystal region over the entire region of the doped region R, and an electric field forming (Step ST40B) to form the polarization-orientation in a predetermined direction in the first crystal region are performed on the optical fiber 100A between timing B1 and timing B2 in FIG. 3B. Further, Step ST40B may be performed after Step ST40A, or may be performed concurrently with Step ST40A. Further, in the optical fiber 100A, a poled second crystal region poled in a direction different from the polarization-orientation of the first crystal region is formed periodically with respect to the first crystal region formed over the entire doped region R along the longitudinal direction of the optical fiber 100A between timing C1 and timing C2 in FIG. 3B. Therefore, the intermittent irradiation of the laser beam (Step ST50A) and the electric field forming (Step ST50B) are performed.

Further, Step ST50B may also be performed after Step ST50A, or may be performed concurrently with Step ST50A.

Specifically, in Step ST40A, as illustrated in FIG. 5, the laser beam from the laser source 310 is continuously emitted to the doped region R between timing B1 and timing B2 through the reflection mirror 320 which is movable along the longitudinal direction (a direction illustrated with arrow S) of the optical fiber 100A of which the surface temperature is kept within a range of 100° C. to 800° C. or within a range of 100° C. to 400° C. With this configuration, the crystal region (a region to be the first section) continuous along the longitudinal direction is formed in the doped region R of the optical fiber 100A. Concurrently with or after Step ST40A, in Step ST40B, a first voltage Va is applied between the electrodes 140A and 140B inserted to the pair of holes 130A and 130B so as to pole the first crystal region. Then, in Step ST50A, as illustrated in FIG. 5, the laser beam from the laser source 310 is emitted to the first crystal region through the reflection mirror 320 which is movable along the longitudinal direction of the optical fiber 100A of which the surface temperature is kept within a range of 100° C. to 800° C. or a range of 100° C. to 400° C. even between timing C1 and timing C2. However, in Step ST50A, the second crystal region (a region to be the second section) is periodically formed in the first crystal region which is continuously provided along the longitudinal direction. Therefore, the laser beam is intermittently emitted. Concurrently with or after Step ST50A, in Step ST50B, a second voltage Vi of which the polarity is inverted to that of the first voltage Va and the absolute value is smaller than that of the first voltage Va is applied between the electrodes 140A and 140B inserted to the pair of holes 130A and 130B. The second crystal region (second section) is formed which is poled in a direction different from the first crystal region (first section). In other words, the repetition structure in which the crystal regions having different directions of polarization-orientation are alternately disposed along the longitudinal direction is formed in the doped region R. Further, after forming the repetition structure (the electric field is formed and the first and second sections are completely poled in directions different from each other), the electrodes 140A and 140B are removed from the hole 130A and 130B respectively.

Figure 8:
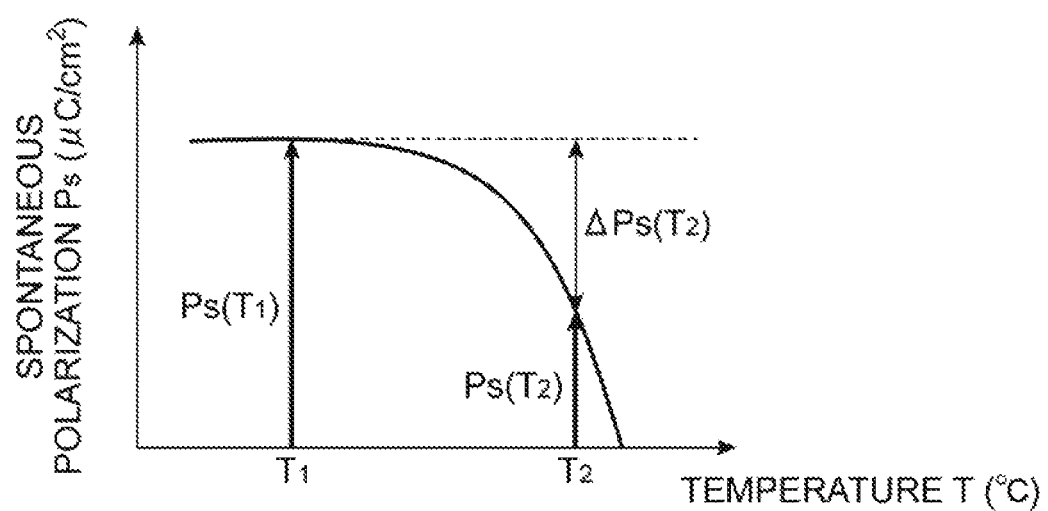
FIG. 8 is a graph schematically illustrating a temperature dependency of a spontaneous polarization.

A mechanism of forming the first crystal region to be the first section and the second crystal region to be the second section will be described using FIG. 8. In other words, in FIG. 8, the horizontal axis represents a temperature T (° C.) of the fiber surface, and the vertical axis represents a spontaneous polarization Ps ($\mu C/cm^2$). FIG. 8 illustrates a schematic view of a temperature dependency of the spontaneous polarization. The spontaneous polarization becomes $Ps(T_1)$ at temperature $T_1$, and the spontaneous polarization becomes $Ps(T_2)$ at temperature $T_2$. A relation between strengths of these spontaneous polarizations satisfies $Ps(T_1) > Ps(T_2)$. In order to inverse these spontaneous polarizations, there is a need to apply the electric field exceeding a coercive electric field of each spontaneous polarization. The coercive electric fields of $Ps(T_1)$ and $Ps(T_2)$ become $E_{Ps(T1)}$ and $E_{Ps(T2)}$ respectively. As illustrated in FIG. 8, the magnitude of the spontaneous polarization is decreased as a temperature is increased. The coercive electric field required for the inversion is lowered along the increase in temperature. A coercive electric field $E_{th}$ required for the polarization-orientation of only the region rising in temperature shows a relation of $E_{Ps(T2)} < E_{th} < E_{Ps(T1)}$. In other words, the temperature (an actual temperature of fiber surface) of the entire crystal is set to $T_1$, and the laser is emitted to form a locally heated region ($T_2$) while applying the coercive electric field $E_{th}$, so that the polarization of only the heated region can be inverted.

FIG. 9 is a diagram illustrating a configuration of the optical device 200 according to the second embodiment which is manufactured according to the flowchart of FIG. 3B. The optical device 200 is a fiber-type optical device comprised of glass containing $SiO_2$. The optical device includes the core region 110, the first cladding region 121 which surrounds the core region 110 and has a refractive index lower than that of the core region 110, and the second cladding region 122 which surrounds the first cladding region 121 and has a refractive index lower than that of the core region 110. The optical device 200 is provided with a repetition structure in which a first crystal region (first section) 171 of which the entire cross section or a part thereof is poled in at least a part of the glass region which is configured by the core region 110 and the first cladding region 121 and a second crystal region (second section) 172 which is poled in a direction different from the first crystal region are alternately disposed along the longitudinal direction. Herein, the "different direction" means that an angle formed between the polarization-orientation of the first crystal region 171 and the polarization-orientation of the second crystal region 172 falls between 91 and 180 degrees. The length of the first crystal region 171 or the second crystal region 172 falls within a range of 1 μm to 1,000 μm. Similarly to the optical device 100 according to the first embodiment, the lengths in the longitudinal direction of the first crystal region 171 and the second crystal region 172 are desirably equal to the coherence length lc in order to realize a highly efficient wavelength conversion. In addition, in a case where a bandwidth of the phase matching condition is necessarily expanded, the repetition structure of the doped region may be nonlinear.

In the first and second embodiments, the rare earth element and the transition metal element are doped to the crystallization target region, and the region is caused to absorb the laser beam to be heated, so that the laser beam irradiation area is crystallized. The region to be doped with the rare earth element and the transition metal element (that is, the doped region R) may be only the core region 110, may be only the first cladding region 121, or may be both the core region 110 and the first cladding region 121. The crystal region may be selected according to applications of the optical devices 100 and 200.

A laser wavelength desirably falls within a range of 100 nm to 1600 nm Any one of a pulse light source and a CW light source may be used as the laser source. In a case where the pulse light source is used, it is possible to suppress unnecessary heating, and the crystallization target region can be written with accuracy. A pulse width desirably falls within a region of 10 ps to 100 ms. In a case where the CW light source is used, the coherency is high. Therefore, for example, it is possible to improve a writing accuracy by a diffracted light caused by a phase mask. Further, in a case where a high-output laser source is used, a beam irradiation area required for the crystallization can be expanded, a range of the diffracted light caused by an optical phase mask can be expanded, and a productivity can be increased compared to a single stroke writing.

Next, a polarized wave holding function of the optical devices 100 and 200 will be described. A wave diffracted in the middle of propagating the incident light is important to the wavelength conversion. Even though depending on the use of the optical device, a diffracted wave direction of the light incident on the optical devices 100 and 200 are matched with the polarization-orientation, or matched with a direction perpendicular to the polarization-orientation. Even in either case, the optical devices 100 and 200 are necessarily configured to prevent the diffracted wave direction from rotating during the propagation of the light. For this reason, the optical devices 100 and 200 are disposed in a straight line to avoid an unnecessary stress, or the polarized wave holding optical fiber (a panda fiber, or a plurality of holes) is desirably used.

For example, in the optical fiber having a pair of holes with the core region interposed therebetween, a stress is applied to the core region due to the presence of the pair of holes, which effectively serves as the polarized wave holding. However, the position of the hole is necessarily set to be near the core region. As a result, the shape of the core region tends to easily become an elliptical shape, and thus it may be not acceptable according to applications. An electrode-integrated optical device is effectively used since a pair of electrodes (conductive regions) are provided as the stress imparting portion with the core region interposed therebetween so as to have a polarized wave holding function, and the shape of the core region is hardly deformed.

As described above, the fiber optical devices 100 and 200 according to the first and second embodiments are possible to perform the wavelength conversion with high stability and efficiency. The repetition structure of the optical device 100 is configured such that the crystal region and the amorphous region are periodically and alternately formed at every lc length in the longitudinal direction. Alternatively, in order to expand the bandwidth of the wavelength conversion, the crystal region and the amorphous region are alternately formed in a state where the period is collapsed. In the crystal region, the QPM method can be introduced by poling the entire cross section or a part thereof in one direction. The repetition structure of the optical device 200 is configured such that two types of crystal regions having different polarizing directions are periodically and alternately formed at every lc length in the longitudinal direction. Alternatively, in order to expand the bandwidth of the wavelength conversion, the two types of crystal regions having different polarizing directions are alternately formed in a state where the period is collapsed. In each of the different types of crystal regions, the QPM method can be introduced by poling the entire cross section or a part thereof in one direction. In addition, in the optical device according to the embodiment compared to the thermal poling of the related art where Ge is doped, the selective crystallization has an increase in nonlinear optical constant and a significantly-high stability, so that the performance can be greatly increased.

Figure 10:
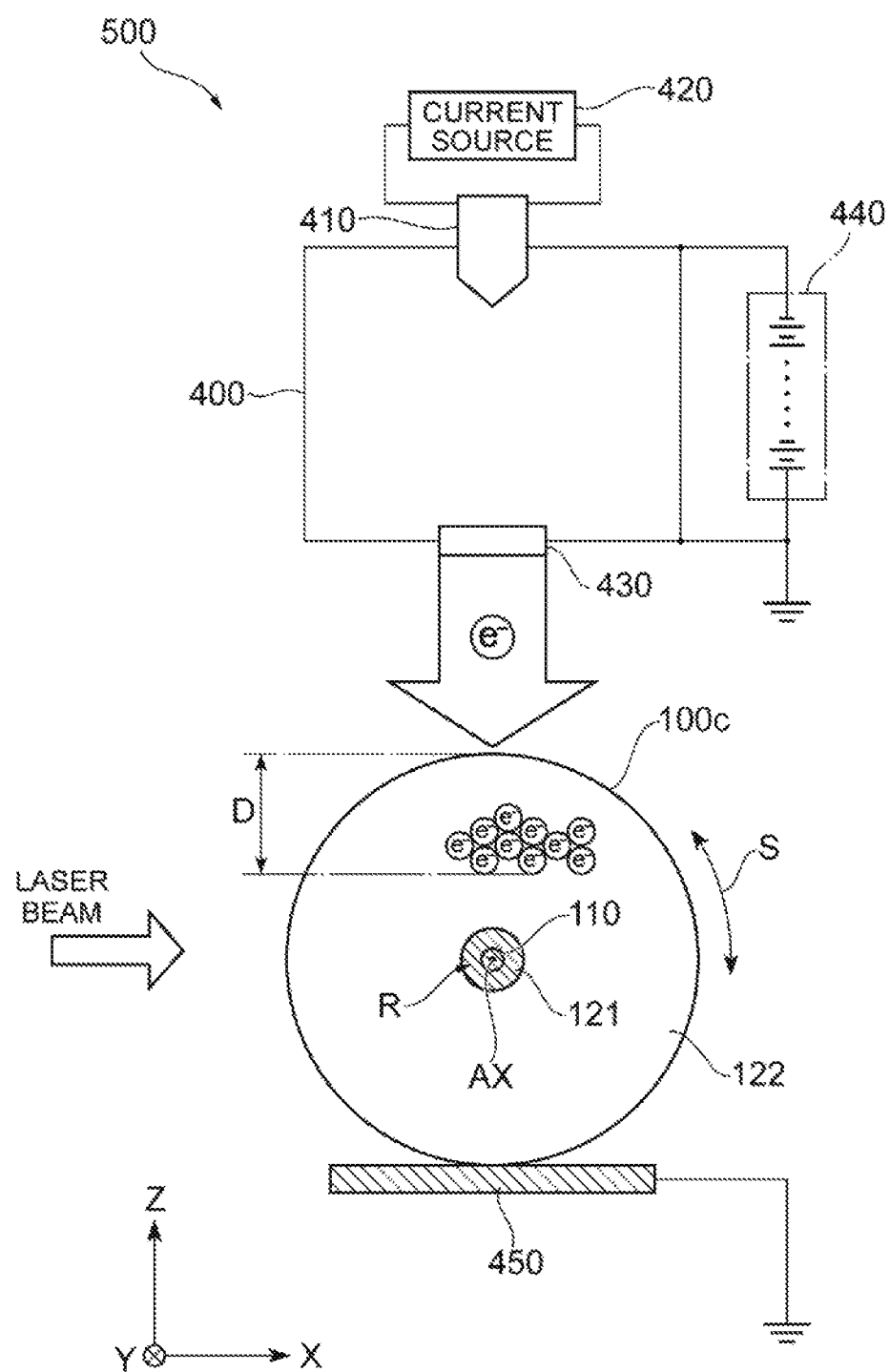
FIG. 10 is a diagram for describing a first electron beam irradiating method which can be employed to apply a voltage to the optical fiber (to form an electric field in the optical fiber).
Figure 11A:
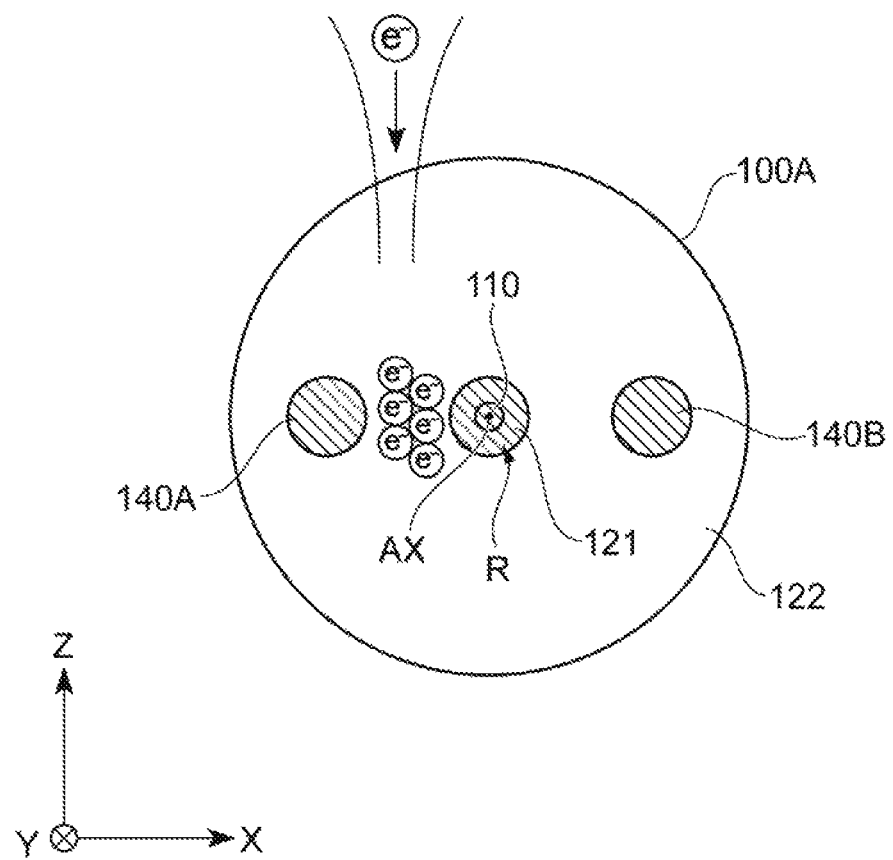
FIG. 11A is a diagram for describing a second electron beam irradiating method which can be employed to apply a voltage to the optical fiber (to form an electric field in the optical fiber).
Figure 11B:
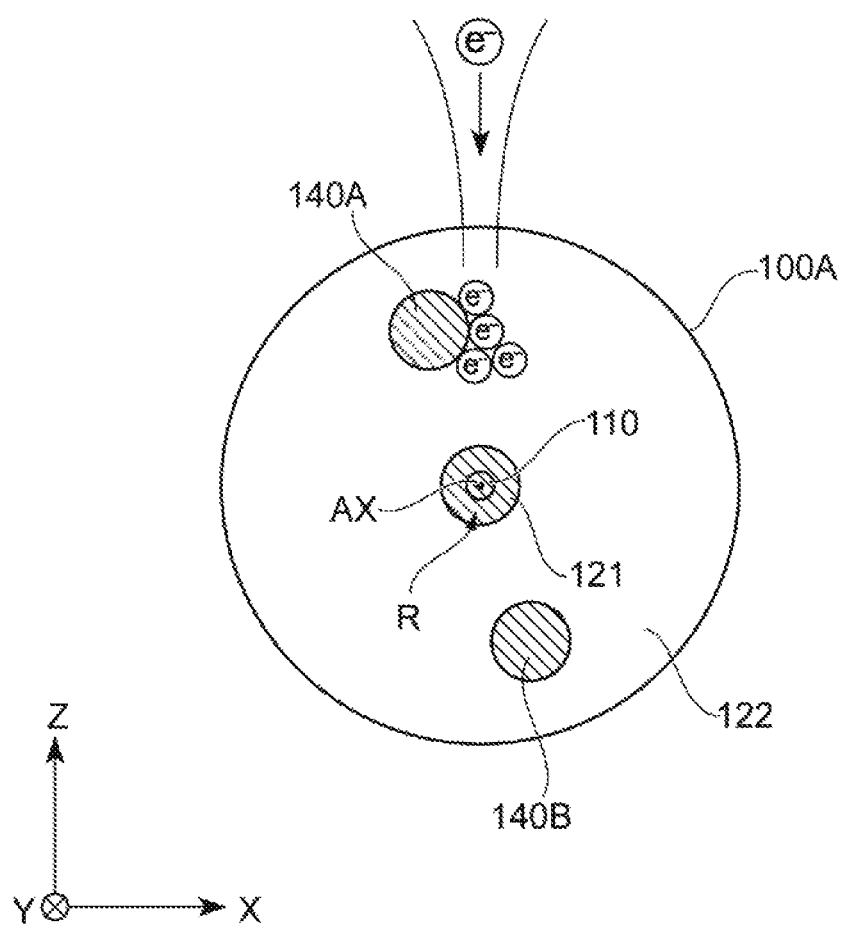
FIG. 11B is a third electronic beam irradiating method which can be employed to apply a voltage to the optical fiber (to form an electric field in the optical fiber).

Further, the method for inverting the spontaneous polarization is not limited to the electric field forming method illustrated in FIGS. 4 and 6, and an electron beam irradiating method is also effective. Further, FIGS. 10, 11A, and 11B are diagrams for describing first to third electron beam irradiating methods which can be applied to the voltage application (the electric field forming in the optical fiber) to the optical fiber. In other words, the electric field forming method using the first to third electron beam irradiations can be applied to Step ST30B in FIG. 3A, Step ST40B in FIG. 3B, and Step ST50B in FIG. 3B.

The electron beam irradiation to the optical fiber can be performed even in any state of a vacuum atmosphere and an air atmosphere. The electron beam irradiation under the air atmosphere is performed by an electron beam processing system (EPS) 500 illustrated in FIG. 10 for example Electrons from a cathode (electron source) are discharged into the air atmosphere from an irradiation window foil 430 (titan or a titan alloy foil of several tens of micron) of the EPS 500. Further, the EPS 500 includes a cathode 410 which discharges an electron beam through the irradiation window foil 430 into a vacuum vessel 400, a current source 420 which supplies a desired current to the cathode 410, and a voltage source 440 which applies a desired accelerating voltage between the cathode 410 and the irradiation window foil 430. Similarly, under the vacuum atmosphere, when electrons are discharged from the cathode 410, the electrons are accelerated in the vacuum vessel 400. The accelerated electrons are discharged into the air atmosphere through the irradiation window foil 430 which separates the vacuum vessel 400 from the air. Even in either case where the accelerated electrons are discharged under the vacuum atmosphere and the air atmosphere, an electron discharge orbit is narrowed to be a required irradiation width using an irradiation coil, and a predetermined region can be irradiated. Further, in FIG. 10, an optical fiber 100C into which the electrons discharged from the EPS 500 are driven includes the core region 110, the first cladding region 121, and the second cladding region 122. A dopant for accelerating the glass crystallization is doped in the doped region R which is configured by the core region 110 and the first cladding region 121.

In the first electron beam irradiating method, as illustrated in FIG. 10, the electrons discharged into the vacuum vessel 400 of the EPS 500 (the electrons discharged from the cathode 410 to which the current of 1 nA to 10 mA is supplied) are accelerated by the accelerating voltage of several kV to several tens of MV (desirably 1 kV to 10 MV) applied between the cathode and the irradiation window foil by the voltage source 440. The electrons are diffused into the second cladding region 122 of the optical fiber 100C. An electron diffusion distance D (diffusion depth) is determined by the accelerating voltage and a density of an irradiation medium, and can be obtained by a Monte Carlo simulation. For example, in a case where the density of the second cladding region 122 is 2.6 g/cm$^2$, and the accelerating voltage is set to about 90 kV, the electron diffusion distance D in the second cladding region 122 becomes about 60 μm. In a case where the outer peripheral surface of the second cladding region 122 is coated, the accelerating voltage is set in consideration of a density of the sheath so as to obtain a predetermined electron diffusion distance D. The region (electric charge reservoir) where the electrons are diffused in the second cladding region 122 is equal to that the negative voltage is generated due to the negative charges of the electrons. Therefore, a high negative voltage is formed by increasing an accumulated charge amount in the region. For example, as illustrated in FIG. 10, in a case where a ground electrode 450 is provided, electrical flux lines run toward the negative charges from the electrode 450. The electric field is formed along the electrical flux lines in the core region 110 (the region serving as the crystal region). The first electron beam irradiating method is effective since there is no need to form the electrode in the second cladding region 122, and the electric field is simply formed in the optical fiber 100C.

Specifically, in a case where the first electron beam irradiating method is applied to Step ST30B of FIG. 3A, a UV laser beam is intermittently emitted along the longitudinal direction (a direction matched to the optical axis AX) of the optical fiber 100C in a state where the surface temperature of the optical fiber 100C is kept within a range of 100° C. to 800° C. or a range of 100° C. to 400° C. in Step ST30A performed between timing A1 and timing A2. Therefore, the repetition structure in which the crystal region (first section) and the amorphous region (second section) are alternately disposed along the longitudinal direction is provided in the doped region R. Further, in a case where Step ST30A and Step ST30B are individually performed, Step ST30A may be performed in the chamber 300 of FIG. 5. In Step ST30B which is performed concurrently with or after Step ST30A, the electrons discharged from the cathode 410 to which a predetermined current is supplied are intermittently emitted to a target region (a region to be the first section) of polarization. The electric charge reservoir is formed in the second cladding region 122 (that is, the diffusion depth of the electrons is at an intermediate position between the doped region R and the outer peripheral surface of the optical fiber 100C). With this configuration, the polarization of the region corresponding to the first section in the doped region R is oriented by the electric field (potential gradient) which is formed between the electrode 450 and the electric charge reservoir (negative charge distribution). In a case where an unnecessary polarization is formed in the amorphous region serving as the second section, the polarization can be erased by the UV laser beam.

Further, in a case where the first electron beam irradiating method is applied to Step ST40B of FIG. 3B and Step ST50B of FIG. 3B, first the UV laser beam is continuously emitted along the longitudinal direction of the optical fiber 100C in a state where the surface temperature of the optical fiber 100C is kept within a range of 100° C. to 800° C. or a range of 100° C. to 400° C. in Step ST40A performed between timing B1 and timing B2. Therefore, the first crystal region is continuously formed along the longitudinal direction. In Step ST40B which is performed concurrently with or after Step ST40A, the electrons discharged from the cathode 410 to which a predetermined current is supplied are intermittently emitted to a target region (a region to be the first section) of polarization. The electric charge reservoir is formed in the second cladding region 122. Further, the electric charge reservoir has an accumulated charge amount which is equal to that when the first voltage Va is applied between the electric charge reservoir and the electrode 450. With this configuration, the polarization is oriented in the first crystal region by the electric field which is formed between the electrode 450 and the electric charge reservoir.

Then, in Step ST50A performed between timing C1 and timing C2, the UV laser beam is intermittently emitted to the first crystal region continuously formed in the optical fiber 100C in a state where the surface temperature of the optical fiber 100C is kept within a range of 100° C. to 800° C. or a range of 100° C. to 400° C. Therefore, the repetition structure in which the first crystal region serving as the first section and the second crystal region serving as the second section are alternately disposed along the longitudinal direction is provided in the doped region. In Step ST50B which is performed concurrently with or after Step ST50A, after the optical fiber 100C is rotated in a direction indicated with arrow S as illustrated in FIG. 10, the electrons discharged from the cathode 410 to which a predetermined current is supplied are intermittently emitted to a target region (a region to be the second section) of polarization. Therefore, the electric charge reservoir is formed in the second cladding region 122. Further, the electric charge reservoir has an accumulated charge amount which is equal to that when the second voltage Vi smaller than the first voltage Va is generated with respect to the electrode 450. The polarization of the second crystal region periodically formed along the longitudinal direction of the optical fiber 100C may be oriented in a direction different from the first crystal region by the electric field which is formed between the electrode 450 and the electric charge reservoir.

In the electric field forming method illustrated in FIGS. 4 and 6, the electric field (potential gradient) is formed mainly using a positive voltage. However, a poled structure may be formed by forming the electric field using a negative voltage to inverse the polarization by the electron beam irradiation. As illustrated in FIG. 11A, in a case where the optical fiber includes two electrodes (for example, the optical fiber 100A of FIG. 4), the electrons may be driven between the electrode 140A and the doped region R (configured by the core region 110 and the first cladding region 121) as the second electron beam irradiating method. In this case, the poling is effectively formed since the negative charges are distributed in the electric charge reservoir, and the electrode 140B is used as a ground electrode so as to form an electric field in the doped region R which is stronger than that in the first electron beam irradiating method (FIG. 10). Alternatively, as the third electron beam irradiating method, as illustrated in FIG. 11B, the optical fiber 100A is rotated in a direction indicated with arrow S illustrated in FIG. 10 (a peripheral direction with the longitudinal direction as the center), and the electrons may be driven into a position different from that in the first electron beam irradiating method. Further, besides the first to third electron beam irradiating methods, the electrode 140A itself may be charged by the electrons driven into the electrode 140A so as to form the electric field between the electrode 140A and a ground electrode 140B. It is also effective to form the poling using the electric field generated as described above. In particular, the third electron beam irradiating method is effective in a case where the size of the electrode 140A is large, and the electron beam irradiation area is small.

Further, in either case of the second electron beam irradiating method (FIG. 11A) and the third electron beam irradiating method (FIG. 11B), Step ST30B of FIG. 3A, Step ST40B of FIG. 3B, and Step ST50B of FIG. 3B can be applied. As an example, the description will be given about a case where the second electron beam irradiating method is applied to a method for manufacturing the optical fiber according to the second embodiment (FIG. 3B). First, the surface temperature of the optical fiber 100A prepared in Step ST10 is kept within a range 100° C. to 800° C. or a range within 100° C. to 400° C. (Step ST20). In such a temperature adjusted state, the laser beam is continuously emitted to the doped region R of the optical fiber 100A along the longitudinal direction at timing B1 to timing B2 (Step ST40A). Step ST40B is performed concurrently with Step ST40A or after Step ST40A. In other words, while or after the first crystal region is continuously formed along the longitudinal direction of the optical fiber 100A, the electrons corresponding to the first voltage Va are intermittently emitted to the first crystal region in a direction perpendicular to the longitudinal direction along the longitudinal direction of the optical fiber 100A. With this configuration, the electric charge reservoir is formed in the second cladding region 122 (the charging of the second cladding region 122), and a region to be the first section is poled in the continuous first crystal region. Further, as described above, the third electron beam irradiating method is effective in a case where the size of the electrode 140A is larger, and an electron beam irradiating area is small. As another method, the electrode 140A itself may be charged.

Step ST50B is performed concurrently with or after Step ST50A even between timing C1 and timing C2. However, unlikely to Step ST40B, in Step ST50B, the electrode 140A is set to a ground electrode, and the electrons are driven into between the doped region R and the electrode 140B so as to form the electric charge reservoir having an electric charge amount corresponding to the second voltage Vi smaller than the first voltage Va. In other words, the electric charge reservoir is formed between the doped region R and the electrode 140B (the electron beam irradiation) while or after the UV laser beam is intermittently emitted to a region to be the second section along the longitudinal direction of the optical fiber 100A, so that the region to be the second section is poled in a direction different from that of the residual first crystal region (first section) by the electric field between the electric charge reservoir and the ground electrode 140A. With this configuration, the repetition structure in which the first crystal region serving as the first section and the second crystal region serving as the second section are alternately disposed along the longitudinal direction is provided in the doped region R.

REFERENCE SIGNS LIST

100, 200 . . . optical device; 100A, 100B, 100C . . . optical fiber; 110 . . . core region; 121 . . . first cladding region; 122 . . . second cladding region; 130A, 130B . . . hole; 140A, 140B, 150A, 150B, 450 . . . electrode; 310 . . . laser source; 410 . . . cathode; 420 . . . current source; 440 . . . voltage source; 161 . . . crystal region (first section); 171 . . . first crystal region (first section); 162 . . . amorphous region (second section); 172 . . . second crystal region (second section); and 500 . . . EPS.

The invention claimed is:

1. A method for manufacturing an optical device, comprising:
   a preparation process of preparing an optical fiber comprised of glass containing $SiO_2$, the optical fiber including a core region which extends along a longitudinal direction of the optical fiber, a first cladding region which surrounds the core region and has a refractive index lower than that of the core region, and a second cladding region which surrounds the first cladding region and has a refractive index lower than that of the core region, wherein at least a part of a region constituted by the core region and the first cladding region includes a doped region containing a dopant for accelerating glass crystallization continuously provided along the longitudinal direction;
   a temperature adjusting process of maintaining a surface temperature of the optical fiber to fall within a range of 100° C. to 800° C.; and
   a section forming process of forming a repetition structure in the doped region by forming an electric field passing through the doped region in middle of or after an intermittent irradiation of a laser beam to the doped region of the optical fiber, the repetition structure including a first section serving as a poled crystal region and a second section serving as an amorphous region, the first section and the second section being alternately disposed and extending along the longitudinal direction, wherein the laser beam is intermittently emitted to the doped region along the longitudinal direction to form the repetition structure in the doped region, and wherein the electric field is formed such that a potential gradient is formed in the doped region along a direction perpendicular to the longitudinal direction.

2. The method for manufacturing the optical device according to claim 1, wherein the electric field is formed such that a potential gradient is formed in the doped region by applying a voltage between two points interposing the doped region along a direction perpendicular to the longitudinal direction.

3. The method for manufacturing the optical device according to claim 2,
wherein the electric field is formed such that an electric charge reservoir is formed in the second cladding region of the optical fiber by emitting an electron beam, the electron beam being generated by a cathode to which a predetermined current is supplied and being accelerated by a predetermined accelerating voltage, to the optical fiber, and then the potential gradient is formed by disposing an electrode on a side opposite the electric charge reservoir with respect to the doped region.

4. A method for manufacturing an optical device, comprising:
a preparation process of preparing an optical fiber comprised of glass containing $SiO_2$, the optical fiber including a core region which extends along a longitudinal direction of the optical fiber, a first cladding region which surrounds the core region and has a refractive index lower than that of the core region, and a second cladding region which surrounds the first cladding region and has a refractive index lower than that of the core region, wherein at least a part of a glass region constituted by the core region and the first cladding region includes a doped region containing a dopant for accelerating glass crystallization continuously provided along the longitudinal direction;
a temperature adjusting process of maintaining a surface temperature of the optical fiber to fall within a range of 100° C. to 800° C.;
a crystal region forming process of forming a first crystal region in the doped region by forming a first electric field passing through the doped region in middle of or after a continuous irradiation of a laser beam to the doped region of the optical fiber, the first crystal region being poled and continuous along the longitudinal direction, wherein the laser beam is continuously emitted to the doped region along the longitudinal direction to form the first crystal region to be continuous in the doped region, and wherein the first electric field is formed such that a potential gradient is formed in the doped region along a first direction perpendicular to the longitudinal direction; and
a section forming process of forming a repetition structure in the doped region by forming a second electric field passing through the first crystal region in middle of or after an intermittent irradiation of the laser beam to the first crystal region, the repetition structure including a first section serving as a part of the first crystal region and a second section serving as a second crystal region being poled in a direction different from the first crystal region, the first section and the second section being alternately disposed and extending along the longitudinal direction, wherein the laser beam is intermittently emitted to the doped region along the longitudinal direction to form the repetition structure in the doped region, and wherein the second electric field is formed such that a potential gradient is formed in the doped region along a second direction which is perpendicular to the longitudinal direction but different from the first direction.

5. The method for manufacturing the optical device according to claim 4,
wherein, in the crystal region forming process, the first electric field is formed such that a potential gradient is formed in the doped region by applying a first voltage Va between two points interposing the doped region along the first direction, and
wherein, in the section forming process, the second electric field is formed such that a potential gradient is formed in the doped region along the second direction by applying a second voltage Vi, the second voltage has a polarity opposite the first voltage Va and has an absolute value smaller than that of the first voltage Va, between the two points interposing the doped region.

6. The method for manufacturing the optical device according to claim 4,
wherein, in the crystal region forming process, the first electric field is formed such that an electron beam is generated by a cathode, the cathode being supplied with a current of a first current value, and accelerated at a predetermined accelerating voltage to irradiate the optical fiber from the first direction so as to form a first electric charge reservoir in the second cladding region of the optical fiber, and then a first electrode is disposed on a side opposite the first electric charge reservoir with respect to the doped region so as to form the potential gradient in the doped region, and
wherein, in the section forming process, the second electric field is formed such that an electric beam is generated by a cathode supplied with a current of a second current value smaller than the first current value and accelerated at the accelerating voltage to irradiate the optical fiber from the second direction so as to form a second electric charge reservoir in the second cladding region of the optical fiber, and then a second electrode is disposed on a side opposite the second electric charge reservoir with respect to the doped region so as to form the potential gradient in the doped region.

7. The method for manufacturing the optical device according to claim 1,
wherein in the cross section of the optical device orthogonal to the longitudinal direction, each cross section of the first sections and the second sections includes in full an entirety of the cross section of the core region.

8. The method for manufacturing the optical device according to claim 4,
wherein in the cross section of the optical device orthogonal to the longitudinal direction, each cross section of the first sections and the second sections includes in full an entirety of the cross section of the core region.

* * * * *